US012580138B2

(12) United States Patent
Gleason et al.

(10) Patent No.: US 12,580,138 B2
(45) Date of Patent: *Mar. 17, 2026

(54) SUPERCAPACITORS AND OTHER ELECTRODES AND METHODS FOR MAKING AND USING SAME

(71) Applicants: Massachusetts Institute of Technology, Cambridge, MA (US); Analog Devices, Inc., Wilmington, MA (US)

(72) Inventors: Karen K. Gleason, Cambridge, MA (US); Brian L. Wardle, Lexington, MA (US); Estelle Cohen, Chestnut Hill, MA (US); Yue Zhou, Brookings, SD (US); Xiaoxue Wang, Cambridge, MA (US); Yosef Stein, Sharon, MA (US)

(73) Assignees: Massachusetts Institute of Technology, Cambridge, MA (US); Analog Devices, Inc., Wilmington, MA (US)

( * ) Notice: Subject to any disclaimer, the term of this patent is extended or adjusted under 35 U.S.C. 154(b) by 97 days.

This patent is subject to a terminal disclaimer.

(21) Appl. No.: 18/494,721

(22) Filed: Oct. 25, 2023

(65) Prior Publication Data

US 2024/0136126 A1 Apr. 25, 2024
US 2024/0234042 A9 Jul. 11, 2024

Related U.S. Application Data

(63) Continuation of application No. 15/931,987, filed on May 14, 2020, now Pat. No. 11,837,403.

(Continued)

(51) Int. Cl.
*H01G 11/28* (2013.01)
*H01G 11/36* (2013.01)
(Continued)

(52) U.S. Cl.
CPC ............ *H01G 11/28* (2013.01); *H01G 11/36* (2013.01); *H01G 11/56* (2013.01); *H01G 11/68* (2013.01);
(Continued)

(58) Field of Classification Search
CPC ........ H01G 11/28; H01G 11/36; H01G 11/56; H01G 11/68; H01G 11/70; H01G 11/02;
(Continued)

(56) References Cited

U.S. PATENT DOCUMENTS 8,684,595 B2 4/2014 Wardle et al.
9,771,264 B2 9/2017 Garcia et al.
(Continued)

FOREIGN PATENT DOCUMENTS

WO   WO 2007/136755 A2   11/2007
WO   WO 2008/054541 A2   5/2008
WO   WO 2009/029218 A2   3/2009

OTHER PUBLICATIONS

Lachman et al., Synthesis of polymer bead nano-necklaces on aligned carbon nanotube scaffolds, 2017, Nanotechnology, 28, 1-7 (Year: 2017).*

(Continued)

*Primary Examiner* — Daniel S Gatewood
(74) *Attorney, Agent, or Firm* — Wolf, Greenfield & Sacks, P.C.

(57) ABSTRACT

Systems and methods involving nanomaterial-based electrodes, such as supercapacitor and battery electrodes that can be flexible, are described.

7 Claims, 14 Drawing Sheets

Related U.S. Application Data

(60) Provisional application No. 62/852,124, filed on May 23, 2019, provisional application No. 62/849,458, filed on May 17, 2019.

(51) Int. Cl.

| | |
|---|---|
| *H01G 11/56* | (2013.01) |
| *H01G 11/68* | (2013.01) |
| *H01G 11/70* | (2013.01) |
| *H01M 4/133* | (2010.01) |
| *H01M 4/36* | (2006.01) |
| *H01M 4/583* | (2010.01) |
| *H01M 4/62* | (2006.01) |

(52) U.S. Cl.
CPC ............ *H01G 11/70* (2013.01); *H01M 4/133* (2013.01); *H01M 4/366* (2013.01); *H01M 4/583* (2013.01); *H01M 4/624* (2013.01)

(58) Field of Classification Search
CPC ...... H01M 4/133; H01M 4/366; H01M 4/583; H01M 4/624; C08K 3/041; Y02E 60/10; Y02E 60/13
See application file for complete search history.

(56) References Cited

U.S. PATENT DOCUMENTS

| | | | | |
|---|---|---|---|---|
| 11,837,403 | B2 | 12/2023 | Gleason et al. | |
| 2003/0077515 | A1* | 4/2003 | Chen .................... | H01M 4/364 |
| | | | | 524/847 |
| 2008/0075954 | A1 | 3/2008 | Wardle et al. | |
| 2009/0311166 | A1 | 12/2009 | Hart et al. | |
| 2010/0196695 | A1 | 8/2010 | Garcia et al. | |
| 2010/0255303 | A1 | 10/2010 | Wardle et al. | |
| 2014/0168856 | A1 | 6/2014 | Vallance et al. | |
| 2017/0341316 | A1* | 11/2017 | Wardle .................... | B29C 70/42 |

OTHER PUBLICATIONS

De Heer et al., Aligned Carbon Nanotube Films: Production and Optical and Electronic Properties, 1995, Science, 268, 845-847 (Year: 1995).*

Vaddiraju et al., Hierarchical Multifunctional Composites by Conformally Coating Aligned Carbon Nanotube Arrays with Conducting Polymer, 2009, Appl. Mater. & Interfaces, 1, 2565-2572 (Year: 2009).*

International Search Report and Written Opinion mailed Aug. 27, 2020 in connection with International Application No. PCT/US2020/032863.

[No Author Listed] 3-Thiotolene. ChemSpider, CSID:21111820, http://www.chemspider.com/Chemical-Structure.21111820.html [last accessed Feb. 2, 2021], 3 pages.

[No Author Listed] Thiophene. ChemSpider, CSID:7739, http://www.chemspider.com/Chemical-Structure.7739.html [last accessed Feb. 2, 2021], 3 pages.

Borrelli et al., Bilayer heterojunction polymer solar cells using unsubstituted polythiophene via oxidative chemical vapor deposition. Solar Energy Mater. Solar Cells. Apr. 2012;99:190-196. Epub Dec. 26, 2011.

Bu et al., Ultra-thin bacterial cellulose/poly(ethylenedioxythiophene) nanofibers paper electrodes for all-solid-state flexible supercapacitors. Electrochimica Acta. May 1, 2018;271:624-631.

Che et al., High-strength carbon nanotube buckypaper composites as applied to free-standing electrodes for supercapacitors. J. Mater. Chem. A. Jan. 17, 2013;1(12):4057-4066.

Deheer et al. Aligned carbon nanotube films: production and optical and electronic properties. Science. May 12, 1995; 268(5212):845-7. doi: 10.1126/science.268.5212.845.

Dong et al., Multi hierarchical construction-induced superior capacitive performance of flexible electrodes for wearable energy storage. Nano Energy. Apr. 2017;34:242-248.

Dong et al., Simultaneous Production of High-Performance Flexible Textile Electrodes and Fiber Electrodes for Wearable Energy Storage. Adv Mater. Feb. 24, 2016;28(8):1675-81. doi: 10.1002/adma.201504747. Epub Dec. 17, 2015.

Dresselhaus et al., Topics in Applied Physics. Nanotechnology. Carbon nanotubes: synthesis, structure, properties, and applications. P. eds. 2001. Springer. vol. 80. 461 pages.

Endo et al., Nanotechnology: 'buckypaper' from coaxial nanotubes. Nature. Feb. 3, 2005;433(7025):476. doi: 10.1038/433476a.

Gleason K.K., CVD Polymers: Fabrication of organic surfaces and devices. John Wiley & Sons. Apr. 20, 2015. 468 pages.

He et al., A large area, flexible polyaniline/buckypaper composite with a core-shell structure for efficient supercapacitors. J. Mater. Chem. A. Feb. 7, 2014; 2(16):5898-5902.

Huang et al., On-chip and freestanding elastic carbon films for micro-supercapacitors. Science. Feb. 12, 2016;351(6274):691-5. doi: 10.1126/science.aad3345.

Kim et al., A new approach to high-performance flexible supercapacitors: mesoporous three-dimensional ni-electrodes. Nano Energy. Sep. 2017;39:639-646.

Kim et al., Nitrogen doped carbon derived from polyimide/multiwall carbon nanotube composites for high performance flexible all-solid-state supercapacitors. J. Power Sources. Mar. 15, 2018;380:55-63.

Ko et al., Flexible supercapacitor electrodes based on real metal-like cellulose papers. Nat Commun. Sep. 14, 2017;8(1):536(1-11). doi: 10.1038/s41467-017-00550-3.

Lachman et al., Synthesis of polymer bead nano-necklaces on aligned carbon nanotube scaffolds. Nanotechnology. Jun. 16, 2017; 28(24):24LT01, 6 pages. doi: 10.1088/1361-6528/aa71c5. Epub May 9, 2017.

Lachman et al., Tailoring thickness of conformal conducting polymer decorated aligned carbon nanotube electrodes for energy storage. Adv. Mater. Interfaces. May 30, 2014;1(7):1400076. Epub Oct. 15, 2014.

Lee et al., Aligned carbon nanotube film enables thermally induced state transformations in layered polymeric materials. ACS Appl Mater Interfaces. Apr. 29, 2015;7(16):8900-5. doi: 10.1021/acsami.5b01544. Epub Apr. 15, 2015.

Lee et al., Impact of carbon nanotube length on electron transport in aligned carbon nanotube networks. Appl. Phys. Lett. Jan. 2015;106(5):053110. Epub Feb. 4, 2015.

Li et al., Conducting polymer nanomaterials: electrosynthesis and applications. Chem Soc Rev. Aug. 2009;38(8):2397-409. doi: 10.1039/b816681c. Epub Apr. 3, 2009.

Li et al., High performance solid-state flexible supercapacitor based on Fe3o4/carbon nanotube/polyaniline ternary films. J. Mater. Chem A. May 25, 2017;5(22):11271-11277.

Liu et al., 2D Metal-Organic Frameworks Derived Nanocarbon Arrays for Substrate Enhancement in Flexible Supercapacitors. Small. Oct. 2018;14(43):e1702641. doi: 10.1002/smll.201702641. Epub Oct. 27, 2017.

Liu et al., Monolithic flexible supercapacitors integrated into single sheets of paper and membrane via vapor printing. Adv. Mater. May 10, 2017;29(19):1606091. Epub Mar. 10, 2017.

Meng et al., Research progress on conducting polymer based supercapacitor electrode materials. Nano Energy. Jun. 2017;36:268-285.

Moon et al., Ag/Au/Polypyrrole Core-shell Nanowire Network for Transparent, Stretchable and Flexible Supercapacitor in Wearable Energy Devices. Sci Rep. Feb. 3, 2017;7:41981(1-10). doi: 10.1038/srep41981.

Park et al., Plasmon-enhanced raman scattering of coaxial hybrid nanowires made with light-emitting polymer and gold. J. Raman Spectroscopy. Aug. 2012;43(8):965-970. Epub Mar. 27, 2012.

Ramadoss et al., Fully flexible, lightweight, high performance all-solid-state supercapacitor based on 3-dimensional-graphene/graphite-paper. J. Power Sources. Jan. 1, 2017;337:159-165.

Rong et al., Low temperature tolerant organohydrogel electrolytes for flexible solid-state supercapacitors. Adv. Energy Mater. Nov. 5, 2018;8(31):1801967. Epub Sep. 20, 2018.

(56)                References Cited

OTHER PUBLICATIONS

Snook et al., Conducting-polymer-based supercapacitor devices and electrodes. J. Power Sources. Jan. 1, 2011;196(1):1-12.

Stein et al., Mesoscale evolution of non-graphitizing pyrolytic carbon in aligned carbon nanotube carbon matrix nanocomposites. J. Mater. Sci. Aug. 22, 2017;52:13799-13811.

Vaddiraju et al., Hierarchical multifunctional composites by conformally coating aligned carbon nanotube arrays with conducting polymer. ACS Appl Mater Interfaces. Nov. 2009;1(11):2565-72. doi: 10.1021/am900487z.

Wang et al., Integrated flexible supercapacitor based on poly (3, 4-ethylene dioxythiophene) deposited on au/porous polypropylene film/au. J. Power Sources. Aug. 15, 2018;395:228-236.

Wang et al., Novel core-shell FeOF/Ni(OH)2 hierarchical nanostructure for all-solid-state flexible supercapacitors with enhanced performance. Adv. Funct. Mater. Aug. 18, 2017;27(31):1701014(1-10). Epub Jul. 14, 2017.

Wang et al., Self-supporting GaN nanowires/graphite paper: novel high-performance flexible supercapacitor electrodes. Small. Feb. 24, 2017;13(8):1603330. Epub Dec. 16, 2016.

Wardle et al., Fabrication and characterization of ultrahigh-volume fraction aligned carbon nanotube-polymer composites. Adv. Mater. Jul. 17, 2008;20(14):2707-14. doi: 10.1002/adma.200800295. Epub Jun. 5, 2008.

Yao et al., Scalable 2D Hierarchical Porous Carbon Nanosheets for Flexible Supercapacitors with Ultrahigh Energy Density. Adv Mater. Mar. 15, 2018;30(11). doi: 10.1002/adma.201706054. Epub Jan. 22, 2018.

Yu et al., Controllable Synthesis of Atomically Thin Type-II Weyl Semimetal WTe2 Nanosheets: An Advanced Electrode Material for All-Solid-State Flexible Supercapacitors. Adv Mater. Sep. 13, 2017;29(34)1701909. doi: 10.1002/adma.201701909. Epub Jul. 10, 2017.

Zang et al., Flexible, temperature-tolerant supercapacitor based on hybrid carbon film electrodes. Nano Energy. Oct. 2017;40:224-232.

Zeng et al., Electrochemical fabrication of carbon nanotube/polyaniline hydrogel film for all-solid-state flexible supercapacitor with high areal capacitance. J. Mater. Chem. A. Oct. 14, 2015;3(47):23864-23870.

Zhang et al., Supported ionic liquid gel membrane electrolytes for flexible supercapacitors. Adv. Energy Mater. May 25, 2018;8(15):1702702. Epub Feb. 1, 2018.

Zheng et al., Flexible, sandwich-like CNTs/NiCo2O4 hybrid paper electrodes for all-solid state supercapacitors. J. Mater. Chem. A. Feb. 21, 2017;5(12):5886-5894.

Zhou et al., A high performance hybrid asymmetric supercapacitor via nano-scale morphology control of graphene, conducting polymer, and carbon nanotube electrodes. J. Mater. Chem. A. Jul. 14, 2014;2(26):9964-9969. Epub Feb. 12, 2014.

Zhou et al., Advanced asymmetric supercapacitor based on conducting polymer and aligned carbon nanotubes with controlled nanomorphology. Nano Energy. Oct. 2014;9:176-185.

Zhou et al., High volumetric electrochemical performance of ultrahigh density aligned carbon nanotube supercapacitors with controlled nanomorphology. Electrochimica Acta. Nov. 30, 2013;111:608-613. Epub Aug. 19, 2013.

Zhou et al., Ultrahigh-areal-capacitance flexible supercapacitor electrodes enabled by conformal P3MT on horizontally aligned carbon-nanotube arrays. Adv. Mater. Jul. 26, 2019;1901916(1-8). Epub Jun. 3, 2019. Supporting information, 10 pages.

* cited by examiner

FIG. 3B                    FIG. 3C

PDMS

P3MT/HACNTs

Separator

HACNTs

PDMS

SUPERCAPACITORS AND OTHER ELECTRODES AND METHODS FOR MAKING AND USING SAME

RELATED APPLICATIONS

This application is a continuation of U.S. patent application Ser. No. 15/931,987, filed May 14, 2020, and entitled "SUPERCAPACITORS AND OTHER ELECTRODES AND METHOD FOR MAKING AND USING SAME," which claims priority under 35 U.S.C. § 119(e) to U.S. Provisional Patent Application Ser. No. 62/852,124, filed May 23, 2019, and entitled "SUPERCAPACITORS AND OTHER ELECTRODES AND METHOD FOR MAKING AND USING SAME," and which claims priority to U.S. Provisional Patent Application Ser. No. 62/849,458, filed May 17, 2019, and entitled "ULTRAHIGH AREAL CAPACITANCE FLEXIBLE SUPERCAPACITOR ELECTRODES ENABLED BY CONFORMAL P3MT ON HORIZONTALLY-ALIGNED CARBON NANOTUBE ARRAYS," each of which is incorporated herein by reference in its entirety for all purposes.

TECHNICAL FIELD

Systems and methods involving nanomaterial-based electrodes, such as supercapacitor and battery electrodes that can be flexible.

BACKGROUND

The increasing demand for portable and flexible electronics such as roll-up displays, bendable transistors, electronic papers, and wearable sensing devices, has inspired the development of flexible energy storage devices. Supercapacitors have been explored in this arena.

Some of these electrodes include nanotubes without significant order in their arrangement. Others include some degree or order, such as nanotubes oriented perpendicular to electro surfaces, conductive fabrics arranged in a weave or approximate weave, or the like. Results have been moderate. Nanocarbon electronic conductors combined with pseudocapacitive material, such as conducting polymer or metal oxides, typically have involved arrangements (geometrical and/or material) that have inhibited potential ion transport and capacitance, particularly under high current density necessary for devices requiring high power density and charge/discharge rates.

SUMMARY

The present invention involves arrangement of nanomaterials at surfaces providing advantageous electronic transport phenomena associated with the surfaces, which can form parts of electronic devices such as supercapacitors, batteries, etc. The nanomaterials can be associated with an auxiliary pseudocapacitive material, for example coated with a polymer of appropriate electronic conductivity, to affect the materials' electronic properties and thereby the overall properties of the electrode or other device.

Methods of making and using such arrangements and devices are also provided.

In one aspect, articles are described. In some embodiments, the article has a surface, and comprises electronically-conductive nanostructures, a majority of which include a longest dimension oriented substantially parallel to the surface and oriented more greatly in a first direction parallel to the surface than in another direction perpendicular to the first direction, wherein a majority of the electronically-conductive nanostructures are associated with a pseudocapacitive material.

In certain embodiments, the article has a surface and comprises electronically-conductive nanostructures, at least some of which include a longest dimension oriented substantially parallel to the surface, the article made by the process of growing nanostructures at the surface in an orientation substantially perpendicular to the surface, then re-arranging a majority of the nanostructures such that they become oriented with a longest dimension substantially parallel to the surface.

In some embodiments, the article comprises electronically-conductive nanostructures, and a material comprising poly(3-methylthiophene) conformally coated over a majority of the electronically-conductive nanostructures.

Some aspects are related to methods. In some embodiments, the method comprises associating pseudocapacitive material with a plurality of electronically-conductive nanostructures.

The subject matter of the present invention involves, in some cases, interrelated products, alternative solutions to a particular problem, and/or a plurality of different uses of one or more systems and/or articles.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIGS. 3A-3D are, according to some embodiments, illustrations and photo images of electrodes based on horizontally-aligned CNTs (HACNTs) with pseudocapacitance via conformal P3MT: FIG. 3A shows the fabrication process of a P3MT/HACNT composite electrode with illustrations of the charged status of HACNT and P3MT/HACNT positive electrodes. FIG. 3B is the chemical structure of P3MT. FIGS. 3C and 3D are optical images of composite electrodes with flexible (FIG. 3C) and rollable (FIG. 3D) properties at a radius of curvature of 5 mm.

FIGS. 4A-4B show SEM images of HACNTs (FIG. 4A) and a P3MT/CNT (FIG. 4B) composite. FIG. 4C depicts the TEM image of a P3MT/CNT composite with coating thickness of ~5 nm. FIG. 4D shows Raman spectra of a P3MT/CNT composite. D-band and G-band are from HACNTs, and the band at 1430 cm$^{-1}$ is from P3MT.

FIG. 5A shows cyclic voltammetry curves at 100 mV s$^{-1}$, and FIG. 5B shows areal capacitance comparison of the three electrodes.

FIG. 6A is a schematic illustration of an asymmetric supercapacitor. FIG. 6B is a plot showing CV curves of cells at various scan rates. FIG. 6C is a plot showing galvanostatic charge/discharge curves of cells at various current densities. FIG. 6D is a plot showing the areal capacitance of cells at different current densities. FIG. 6E is a Ragone plot of cells and the comparison with other works.

FIG. 7A illustrates flat and bending (folded, with bending angle 180°, and radius of curvature ~5 mm) states of cells. FIG. 7B is a plot showing CV curve comparison at 100 mV s$^{-1}$ of flat and bending states. FIG. 7C is a Nyquist plot comparison of flat and bending states. FIG. 7D shows cycling test results with bending every 1000 cycles.

DETAILED DESCRIPTION

Figure 1A:
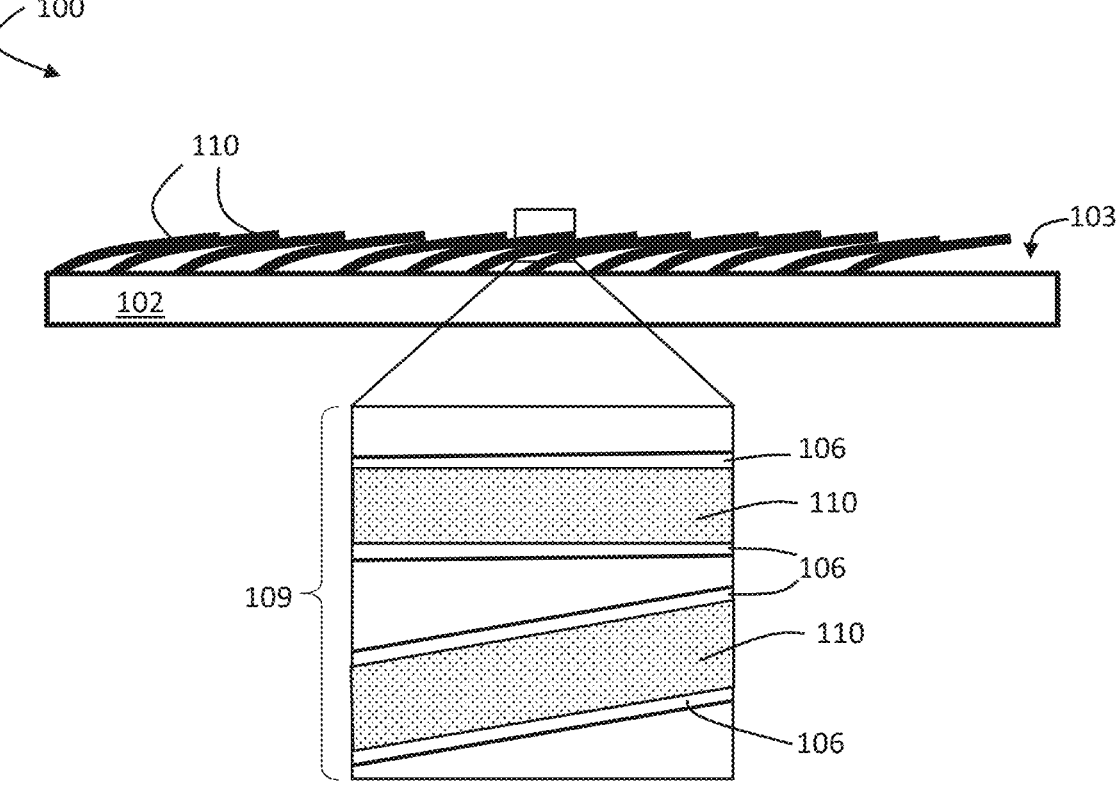
FIG. 1A is a cross-sectional schematic diagram of an article comprising nanostructures associated with pseudocapacitive material, in accordance with certain embodiments.

Systems and methods involving electrodes, which can form the basis of electronic devices, are described. The invention facilitates operation under high power conditions and rapid charging, high power density and high energy density technologies.

One aspect of the invention involves the discovery of drawbacks in some electrodes that form the state of the art, namely, electrodes that include electronically conductive carbon nanotubes and/or other structures that have been recognized by the inventors as having insufficient order in their arrangement for adequate performance. Many prior electrodes include less-ordered, even randomly-dispersed conductive nanotubes in flexible substrates, leading to tortuous ion pathways inside the electrode, impeding ion transport. Other prior electrodes include conductive materials arranged in weaves or the like. The recognition of drawbacks of some prior art arrangements is one aspect of the invention. Other aspects are described below with respect to electrodes, capacitors, systems, and methods.

Certain embodiments relate to nanocarbon electronic conductors combined with pseudocapacitive materials, such as conducting polymers or metal oxides. These composites can display outstanding electrochemical properties and mechanical flexibility. These characteristics in thin film form, can allow for the fabrication of flexible and light-weight electrodes for novel electrochemical energy storage devices like supercapacitors.

In accordance with certain embodiments, flexible densified horizontally-aligned CNT arrays (HACNTs) with controlled nanomorphology for advantaged ion transport paths are introduced having conformally-coated poly(3-methylthiophene) (P3MT) conducting polymer to impart pseudocapacitance. The resulting P3MT/HACNT nanocomposite electrodes can exhibit high areal capacitance. For example, the resulting P3MT/HACNT nanocomposite electrodes can exhibit an areal capacitance of 3.1 F cm$^{-2}$ at 5 mA cm$^{-2}$, with areal capacitance shown to remain high at 1.8 F cm$^{-2}$ even at a current density of 200 mA cm$^{-2}$. The P3MT/HACNT positive electrode assembled in an asymmetric supercapacitor cell with HACNTs as the negative electrode can deliver more than 1-2 orders of magnitude improvement in both areal energy and power density over state-of-the-art all-nanocarbon cells (e.g., at 1.1 mWh cm$^{-2}$ and 1.75 W cm$^{-2}$, respectively). Further, in accordance with certain embodiments, little change (<0.5%) in cell performance is observed under high strains due to bending (e.g., in a 5 mm radius of curvature under cyclic operation), demonstrating mechanical and electrochemical stability of the hybrid nanostructured composite electrodes.

In one aspect, the invention involves an article having a surface, and including, among other possible components, electronically-conductive nanostructures, a majority of which include a longest dimension oriented substantially parallel to the surface, and oriented more greatly in a first direction parallel to the surface than in another direction perpendicular to the first direction. It has been discovered that this orientation, alone or in combination with certain other materials associated with the nanostructures, such as coatings or the like, and arrangements described herein, can provide significantly advantageous electronic and ionic performance.

Where electronically-conductive nanostructures are oriented substantially parallel to the surface, they may also be oriented substantially non-parallel to the surface of the growth substrate (when they are grown on the substrate such as by chemical vapor deposition). In some cases, the longitudinal axes of the nanostructures are oriented in a substantially perpendicular direction with respect to the surface of the growth substrate. As described more fully below, an advantageous feature of some embodiments of the invention may be that the alignment of nanostructures in the nanostructure forest may be substantially maintained, even upon subsequent processing (e.g., application of a force to the forest, transfer of the forest to other surfaces, and/or combining the forests with secondary materials such as polymers, metals, ceramics, piezoelectric materials, piezomagnetic materials, carbon, and/or fluids, among other materials).

In this aspect, a majority of the nanostructures include a longest dimension oriented substantially parallel to the surface. One example of such an arrangement is shown in FIG. 1A, which illustrates article 100 in which nanostructures 110 include longest dimensions that are oriented substantially parallel to surface 103 of substrate 102. This can be accomplished in a variety of ways and, in one set of embodiments, as illustrated in figures presented in the examples below, elongated electronically conductive nanostructures are presented at a surface in a substantially vertical arrangement (oriented substantially perpendicular to the surface). This can be accomplished by, for example, growing carbon nanotubes on a surface. Subsequently, the nanostructures can be re-arranged so as to be positioned with a majority having a long access oriented substantially parallel to the surface. This can be accomplished by rolling a mechanical device across substantially vertically-aligned nanotubes, as described in the figures herein, or other operations which are available to those of originally skill in the art and which could be routinely implemented based on the teachings of this disclosure.

In one set of embodiments of facilitating this arrangement of nanostructures, as shown in figures herein, long axes are both oriented substantially parallel to the surface and oriented substantially parallel to each other. This does not mean that all long axes of all nanostructures are oriented in this way, it means that a majority are so oriented, such that, upon visual inspection of, for example of an SEM image, those of ordinary skill in the art will conclude that alignment is more parallel to the surface than otherwise. In another set of embodiments, not only is alignment more parallel to the surface than otherwise but a majority of the nanostructures are aligned in one axis parallel to the surface than the axis perpendicular to the first axis (and also parallel to the surface). This particular set of embodiments, although not critical to the invention, is but one example and can be described in contrast to a traditional weave in which approximately half of the nanostructures would be aligned with one axis parallel to the surface and another approximate half would be aligned with an axis also parallel to the surface but perpendicular to the first axis. While that arrangement (a majority of nanostructure axes parallel to the surface, but not directionally aligned with each other within the plane of the surface) is also within the scope of certain embodiments of the invention, so long as this otherwise facilities good electronic properties, in another set of embodiments, as noted, it is not.

In the arrangement described here and in connection with figures herein in which substantially vertically-aligned nanostructures (for example, carbon nanotubes grown from a catalytically-facilitated chemical vapor deposition process) are re-oriented so as to be substantially parallel to the surface, in one set of embodiments most ends of the nanostructures that had been at the surface remain substantially attached to the surface while the opposing ends, bent parallel to the surface, are not attached to the surface. In another set of embodiments the nanostructures, in the re-arrangement process, substantially detach from the surface so that the resulting arrangement includes nanostructures, a majority of which are substantially parallel to surface, with a majority of ends not attached to the surface or in some embodiments where essentially no ends of nanostructures are attached to the surface.

Without wishing to be bound by any theory, advantageous electronic, ionic, and mechanical performance of embodiments of the invention may be facilitated by nanostructures substantially aligned parallel to a surface such that junctures from one nanostructure to another are better facilitated and lead to better electronic transport.

In one set of embodiments a pseudocapacitive material is associated with some or all of the nanostructures at the surface. As used herein, "pseudocapacitive material" means a material that can interact with the nanostructures in a way that balances electronic conductivity with the ability to enhance capacitive function of the nanostructures. For example, a pseudocapacitive material can be co-mixed with nanostructures that are then applied to a surface, or nanostructures can be formed on a surface and then a pseudocapacitive material can be added, for example via vapor deposition, precipitation from solution, or other technique available to those of ordinary skill in the art. The pseudocapacitive material, in one set of embodiments, does not define a continuous carrier phase within which nanostructures are embedded, but instead defines a phase associated with nanostructures, the overall arrangement being porous.

The porous structure can be controlled by those of ordinary skill in the art and selected based on the teachings of this disclosure to allow sufficient access by the nanostructures to a medium, such as an electrolyte, providing the electronic and ionic connectivity and conductivity to all aspects of the device for appropriate function. For example, nanostructures can be conformally coated (a coating conforming to enough of the surface of the nanostructure so as to facilitate electronic transport) while spacing between coated nanostructures defines porosity sufficient for device function, such as ion transport. One example is illustrated in inset 109 of FIG. 1A, in which nanostructures 110 are coated with a conformal coating of pseudocapacitive material 106. This can be accomplished in a number of ways such as formation of nanostructures at the surface as described and, before or after any rearrangement necessary to render the majority aligned parallel to the surface (if begun with alignment not parallel to the surface), and chemical vapor deposition of a conductive polymer primarily at the surfaces of the nanostructures. In some embodiments, it can be advantageous to coat the nanostructures after they have been rearranged to render the majority aligned parallel to the surface (e.g., by rolling over the nanostructures with a roller, or by any other suitable method). The ability to conformally coat the nanostructures after they have been so rearranged was unexpected, and it is believed that coatings produced in this manner can exhibit improved electronic and/or mechanical characteristics relative to coatings that are applied prior to rearranging the nanostructures (e.g., due to a reduction or elimination of mechanical stresses imposed on the coating of pseudocapacitive material during rearrangement of the nanostructures).

The pseudocapacitive material used in such coating or other arrangement should be selected to be of sufficient electronic and/or ionic conductivity to facilitate electronic transport to and from the nanostructures and between nanostructures, while having properties sufficient to facilitate charge storage associated with the coated nanostructures (charge storage either at the surface of the nanostructures and/or surface of the coated nanostructures). Pseudocapacitive material, in one set of embodiments, comprises a conductive polymer such as poly(3-methylthiophene), polyaniline, or the like. Those of ordinary skill in the art can select such materials based on the teachings herein. In one set of embodiments, a conductive polymer is selected, as a pseudocapacitive material, such that one unit of charge can be stored per monomer unit of polymer. The ease or difficulty of inserting or removing charge from the material, such as the polymer, should be considered by those of ordinary skill in the art in selecting such materials for use in this invention. In some embodiments, the pseudocapacitive material is or comprises an electronically and/or ionically conductive polymer. In some embodiments, the pseudocapacitive material comprises one or more metal oxides.

Coatings of pseudocapacitive material can be at a variety of dimensions. In one set of embodiments, nanostructures are coated at an average thickness of between 0.1 and 50 nm, or between 1 and 50 nm, or between 2 and 50 nm, or between 3 and 25 nm, or between 3 and 10 nm. In some embodiments, nanostructures have a starting (uncoated) diameter of less than 1 micron (i.e., 1 micrometer, or 1000 nanometers), less than 500 nm, less than 250 nm, or less than 100 nm. In one set of embodiments nanostructures have a starting (uncoated) diameter of between 2 and 15 nm or between 4 and 10 nm. Coated nanostructures can have a diameter, including nanostructure and coating, of between 5 and 50 nm, 7 and 30 nm or between 12 and 25 nm, on average, in one set of embodiments. In some embodiments, the pseudocapacitive material coats the nanostructures such that the nanostructures have an average, coated diameter of at least 0.1 nm, or at least about 0.5 nm, or at least about 1.0 nm.

Nanostructures of the invention can be selected from a wide variety of species as described elsewhere herein. As one example, carbon nanotubes are used, such as single-walled carbon nanotubes.

Substrates can be selected by those of ordinary skill in the art based on a particular need. The substrate can be a current collector, or any device with an electronically conductive surface adjacent the nanostructures, and connected or connectable to a circuit, when appropriate.

Volumetric loading of the nanostructures can be selected by those of ordinary skill in the art across a variety of ranges to facilitate good operation. In one set of embodiments the invention involves a packing density (volumetric presence) of nanostructures, coated or not, in excess of 1%, 5%, 10%, 15%, or 20% or greater. In some embodiments, the invention involves a packing density (volumetric presence) of nanostructures, coated or not, of 78% or less, 65% or less, or 50% or less.

The scale of porosity, that is, the spacing between nanostructures associated with the surface, whether coated or not, in one set of embodiments is within 10% of the dimension of the positive or negative ions utilized in an electrolyte used with the device. Ion diffusion in and out of the porous structure can thus be facilitated for use in embodiments requiring this. A variety of porosities as descried herein can be used. In one set of particular embodiments, porosity of 5-15 nm (nanometers) in average dimension, and averaged across pores, is selected. In another set of embodiments porosity between 5 nm and 100 nm is provided. In some embodiments, at least 10%, at least 20%, or at least 30% (and/or, less than or equal to 90%, less than or equal to 80%, or less than or equal to 70%) of the volume of an electrode in which the nanostructures are arranged is externally accessible to a fluid (e.g., a liquid electrolyte).

In embodiments in which the nanostructures are part of an electrode that is part of a capacitor or other power-producing device, any of a variety of electrolytes can be used. In some embodiments, aqueous electrolytes can be used. In certain embodiments, non-aqueous (e.g., organic) electrolytes can be used.

In one set of embodiments devices are provided with flexible substrates, resulting in overall electrodes or complete devices that can be flexible. One aspect of the invention is the discovery that orientation of nano structures as described herein on a flexible substrate allows the substrate to be flexed in an operational device with essentially zero or low loss of performance. For example, substrate surfaces of the invention can be reoriented from a first configuration, which can be essentially flat or can be curved, to a second configuration where the radius of curvature changed between the first orientation and the second orientation by at least 5%, 10%, 15%, 20%, 40%, 50%, or more with loss of one or more performance parameters of less than 50%, less than 25%, less than 10%, less than 5%, or less than 2% in value.

Figure 2:
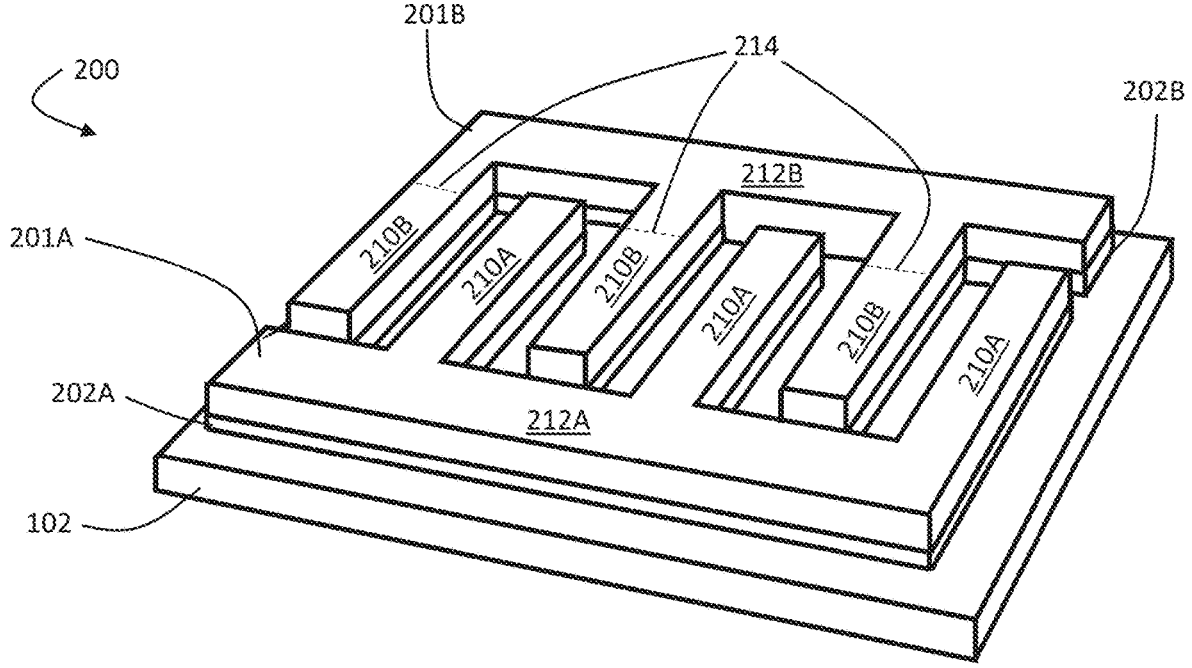
FIG. 2 is a perspective view schematic illustration of a device comprising nanostructures arranged in patterns, according to certain embodiments.

In some embodiments, the electronically-conductive nanostructures are arranged in a pattern. Such patterns may be achieved, for example, by arranging catalyst on a substrate in a pattern and subsequently growing nanostructures from the patterned catalyst. In some embodiments, the article comprises a first set of electronically-conductive nanostructures arranged in a first pattern and a second set of electronically-conductive nanostructures arranged in a second pattern that is interdigitated with the first pattern. One example of such an arrangement is shown in FIG. 2. In FIG. 2, article 200 comprises a first set of electronically-conductive nanostructures 201A arranged in a first pattern and a second set of electronically-conductive nanostructures 201B arranged in a second pattern that is interdigitated with the first pattern. In FIG. 2, nanostructures 201A are arranged over current collector 202A (which may be formed, for example, from the catalyst used to grow nanostructures 201A) which is in turn arranged over substrate 102. Similarly, in FIG. 2, nanostructures 201B are arranged over current collector 202B (which may be formed, for example, from the catalyst used to grow nanostructures 201B). Current collector 202A and/or 202B can be arranged over substrate 102.

In some embodiments, the nanostructures can be arranged within an electrode in a pattern having relatively small features (e.g., milliscale, microscale, or even nanoscale features). In some embodiments, the pattern in which the nanostructures are arranged comprises at least one elongated feature having a cross-sectional dimension, measured parallel to the plane on which the nanostructures are arranged and perpendicular to the length of the elongated feature, of less than or equal to 1 centimeter, less than or equal to 100 millimeters, less than or equal to 10 millimeters, less than or equal to 1 millimeter, less than or equal to 100 microns, less than or equal to 10 microns, less than or equal to 1 micron, or less than or equal to 100 nm. In some embodiments, the pattern in which the nanostructures are arranged comprises at least one elongated feature having a cross-sectional dimension, measured parallel to the plane on which the nanostructures are arranged and perpendicular to the length of the elongated feature, of greater than or equal to 10 nm.

In some embodiments, the nanostructures are part of an electrode comprising a plurality of elongated protrusions extending outward from a base structure. The electrode can be, in certain embodiments, one of a pair of interdigitated electrodes. One example of this arrangement is shown in FIG. 2, in which interdigitated electrodes 201A and 201B each comprise a plurality of elongated protrusions 210 extending from base structure 212. In some embodiments, some or all of the elongated protrusions have a cross-sectional dimension, measured parallel to the plane on which the nanostructures are arranged and perpendicular to the length of the elongated feature, of less than or equal to 1 centimeter, less than or equal to 100 millimeters, less than or equal to 10 millimeters, less than or equal to 1 millimeter, less than or equal to 100 microns, less than or equal to 10 microns, less than or equal to 1 micron, or less than or equal to 100 nm. In some embodiments, some or all of the elongated protrusions have a cross-sectional dimension, measured parallel to the plane on which the nanostructures are arranged and perpendicular to the length of the elongated feature, of greater than or equal to 10 nm. For example, referring to FIG. 2, in some embodiments, protrusions 210B have cross-sectional dimensions indicated by dashed lines 214. Cross-sectional dimensions 214 are measured parallel to the top plane of substrate 102 (on which the nanostructures are arranged) and perpendicular to the length of elongated features 210B. In certain embodiments, cross-sectional dimensions 214 can be less than or equal to 1 millimeter (or within any of the other ranges recited above).

A number of electronic performance parameters of advantageous value can be realized with devices of the invention and, as noted above, one or more of them can experience minimal or imperceptible change in value when the device is flexed or re-oriented (radius of curvature change) as described above. Some of these parameters include power density, energy density, capacitance, and the like. The invention can, in various embodiments, achieve performance characteristics as follows:

Areal capacitance (capacitance per unit area) of at least 1.0 $F/cm^2$ at 5 $mA/cm^2$, or at least 2.0 $F/cm^2$ at 5 $mA/cm^2$, or at least 3.0 $F/cm^2$ at 5 $mA/cm^2$;

Areal energy and power density of at least 0.5 $mWhr/cm^2$ and 0.5 $W/cm^2$, respectively, or at least 0.75 $mWhr/cm^2$ and 1.0 $W/cm^2$, respectively, or at least 1.0 $mWhr/cm^2$ and 1.5 $W/cm^2$, respectively;

Areal capacitance retention with at least 0.5 $F/cm^2$, 1.0 $F/cm^2$, or 1.8 $F/cm^2$ even at a current density as high as 200 $mA/cm^2$; and/or Areal cell capacitance retention of at least 25%, 50%, or 75% from 0.72 $F/cm^{-2}$ to 0.48 F $cm^2$ when increasing the current density from 5 $mA/cm^2$ to 200 $mA/cm^2$.

The devices of the invention also can achieve high current density and high charge discharge rates, and also high energy density, in devices as described herein. The association of pseudocapacitive material with nanostructures according to embodiments described herein can also provide benefits related to charging of devices comprising electrodes containing the nanostructures, such as enhanced charging at low input power.

Devices that can be made using techniques of the invention include essentially any electronic device where electrodes with good electronic transport and/or ionic conductivity interface are valued, such as batteries, logic devices, memory devices, capacitors, including supercapacitors and the like.

In certain embodiments, the articles comprising the electronically-conductive nanostructures and pseudocapacitive materials described herein further comprise a current collector in electronic communication with the electronically-conductive nanostructures. The current collector can, in some embodiments, comprise a catalyst material.

Certain embodiments are directed to capacitors. The capacitor can comprise, in some embodiments, any of the articles described herein (e.g., an article comprising electronically-conductive nanostructures and pseudocapacitive materials) arranged as or in an electrode (e.g., a positive electrode) in an asymmetric or a symmetric capacitor cell.

The following is a description of structures, definitions, and parameters that can be used in connection with the invention:

As used herein, the term "nanostructure" refers to an object having at least one cross-sectional dimension of less than 1 micron. In some embodiments, the nanostructure has at least one cross-sectional dimension of less than 500 nm, less than 250 nm, less than 100 nm, less than 75 nm, less than 50 nm, less than 25 nm, less than 10 nm, or, in some cases, less than 1 nm. Nanostructures described herein may have, in some cases, a maximum cross-sectional dimension of less than 1 micron, less than 500 nm, less than 250 nm, less than 100 nm, less than 75 nm, less than 50 nm, or less than 25 nm.

As used herein, the term "elongated nanostructure" refers to a structure having a maximum cross-sectional diameter of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. Those skilled in the art would understand that the aspect ratio of a given structure is measured along the longitudinal axis of the elongated nanostructure, and is expressed as the ratio of the length of the longitudinal axis of the nanostructure to the maximum cross-sectional diameter of the nanostructure. The "longitudinal axis" of an article corresponds to the imaginary line that connects the geometric centers of the cross-sections of the article as a pathway is traced, along the longest length of the article, from one end to another.

In some cases, the elongated nanostructure may have a maximum cross-sectional diameter of less than 1 micron, less than 100 nanometers, less than 50 nanometers, less than 25 nanometers, less than 10 nanometers, or, in some cases, less than 1 nanometer. A "maximum cross-sectional diameter" of an elongated nanostructure, as used herein, refers to the largest dimension between two points on opposed outer boundaries of the elongated nanostructure, as measured perpendicular to the length of the elongated nanostructure (e.g., the length of a carbon nanotube). The "average of the maximum cross-sectional diameters" of a plurality of structures refers to the number average.

The elongated nanostructure can have a cylindrical or pseudo-cylindrical shape, in some embodiments. In some embodiments, the elongated nanostructure can be a nanotube, such as a carbon nanotube. Other examples of elongated nanostructures include, but are not limited to, nanofibers and nanowires.

Elongated nanostructures can be single molecules (e.g., in the case of some nanotubes) or can include multiple molecules bound to each other (e.g., in the case of some nanofibers).

As used herein, the term "nanotube" refers to a substantially cylindrical elongated nanostructure comprising a fused network of primarily six-membered rings (e.g., six-membered aromatic rings). Nanotubes may include, in some embodiments, a fused network of at least 10, at least 100, at least 1000, at least $10^5$, at least $10^6$, at least $10^7$, or at least $10^8$ rings (e.g., six-membered rings such as six-membered aromatic rings), or more. In some cases, nanotubes may resemble a sheet of graphite formed into a seamless cylindrical structure. It should be understood that the nanotube may also comprise rings or lattice structures other than six-membered rings. According to certain embodiments, at least one end of the nanotube may be capped, i.e., with a curved or nonplanar aromatic group.

Elongated nanostructures may be formed of a variety of materials, in some embodiments. In certain embodiments, the elongated nanostructures comprise carbon (e.g., carbon-based nanostructures, described in more detail below). Other non-limiting examples of materials from which elongated nanostructures may be formed include silicon, indium-gallium-arsenide materials, boron nitride, silicon nitride (e.g., $Si_3N_4$), silicon carbide, dichalcogenides ($WS_2$), oxides (e.g., titanium dioxide, molybdenum trioxide), and boron-carbon-nitrogen compounds (e.g., $BC_2N_2$, $BC_4N$). In some embodiments, the elongated nanostructure may be formed of one or more inorganic materials. Non-limiting examples include semiconductor nanowires such as silicon (Si) nanowires, indium-gallium-arsenide (InGaAs) nanowires, and nanotubes comprising boron nitride (BN), silicon nitride ($Si_3N_4$), silicon carbide (SiC), dichalcogenides such as ($WS_2$), oxides such as titanium dioxide ($TiO_2$) and molybdenum trioxide ($MoO_3$), and boron-carbon-nitrogen compositions such as $BC_2N_2$ and $BC_4N$. In certain embodiments, in instances where the elongated nanostructures are made of semiconducting or electronically insulating materials, they can be coated with one or more electronically conductive materials to impart electronic conductivity.

As used herein, the term "carbon-based nanostructure" refers to articles having a fused network of aromatic rings, at least one cross-sectional dimension of less than 1 micron, and comprising at least 30% carbon by mass. In some embodiments, the carbon-based nanostructures may comprise at least 40%, at least 50%, at least 60%, at least 70%, at least 80%, at least 90%, or at least 95% of carbon by mass, or more. The term "fused network" would not include, for example, a biphenyl group, wherein two phenyl rings are joined by a single bond and are not fused. Examples of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like. In some embodiments, the carbon-based nanostructures comprise hollow carbon nanoshells and/or nanohorns.

In some embodiments, a carbon-based nanostructure may have at least one cross-sectional dimension of less than 500 nm, less than 250 nm, less than 100 nm, less than 75 nm, less than 50 nm, less than 25 nm, less than 10 nm, or, in some cases, less than 1 nm. Carbon-based nanostructures described herein may have, in some cases, a maximum cross-sectional dimension of less than 1 micron, less than 500 nm, less than 250 nm, less than 100 nm, less than 75 nm, less than 50 nm, less than 25 nm, less than 10 nm, or, in some cases, less than 1 nm.

According to certain embodiments, the carbon-based nanostructures are elongated carbon-based nanostructures. As used herein, the term "elongated carbon-based nanostructure" refers to a carbon-based nanostructure structure having a maximum cross-sectional diameter of less than or equal to 1 micron and a length resulting in an aspect ratio greater than or equal to 10. In some embodiments, the elongated nanostructure can have an aspect ratio greater than or equal to 100, greater than or equal to 1000, greater than or equal to 10,000, or greater. As noted above, those skilled in the art would understand that the aspect ratio of a given structure is measured along the longitudinal axis of the elongated nanostructure, and is expressed as the ratio of the length of the longitudinal axis of the nanostructure to the maximum cross-sectional diameter of the nanostructure.

In some cases, the elongated carbon-based nanostructure may have a maximum cross-sectional diameter of less than 1 micron, less than 100 nanometers, less than 50 nanometers, less than 25 nanometers, less than 10 nanometers, or, in some cases, less than 1 nanometer. As noted above, the "maximum cross-sectional diameter" of an elongated nanostructure, as used herein, refers to the largest dimension between two points on opposed outer boundaries of the elongated nanostructure, as measured perpendicular to the length of the elongated nanostructure (e.g., the length of a carbon nanotube). As noted above, the "average of the maximum cross-sectional diameters" of a plurality of structures refers to the number average.

The elongated carbon-based nanostructure can have a cylindrical or pseudo-cylindrical shape, in some embodiments. In some embodiments, the elongated carbon-based nanostructure can be a carbon nanotube. Other examples of elongated carbon-based nanostructures include, but are not limited to, carbon nanofibers and carbon nanowires.

Elongated carbon-based nanostructures can be single molecules or can include multiple molecules bound to each other.

In some embodiments, the carbon-based nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. In some cases, carbon nanotubes may include a wall that comprises fine-grained $sp^2$ sheets. In certain embodiments, carbon nanotubes may have turbostratic walls. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, organic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube comprises a multi-walled or single-walled carbon nanotube with an inner diameter wider than is attainable from a traditional catalyst or other active growth material. In some cases, the carbon nanotube may have a diameter less than 1 micron, less than 500 nm, less than 250 nm, less than 100 nm, less than 50 nm, less than 25 nm, less than 10 nm, or, in some cases, less than 1 nm.

As used herein, an "arrangement" of elongated nanostructures corresponds to a plurality of elongated nanostructures arranged in relation to each other as described herein. In some embodiments, the arrangement of elongated nanostructures comprises at least 5, at least 10, at least 50, at least 100, at least 500, at least 1000, or at least 10,000 elongated nanostructures. In some such embodiments, the arrangement of elongated nanostructures may comprise at least $10^6$, at least $10^7$, at least $10^8$, at least $10^9$, at least $10^{10}$, at least $10^{11}$, at least $10^{12}$, or at least $10^{13}$ elongated nanostructures. Those of ordinary skill in the art are familiar with suitable methods for forming arrangements of elongated nanostructures with benefit of the disclosure provided here. For example, in some embodiments, the arrangement of elongated nanostructures can be catalytically grown (e.g., using a growth catalyst deposited via chemical vapor deposition process).

In some embodiments in which the nanostructures are grown on a substrate, the set of substantially aligned nanostructures may be oriented such that the longitudinal axes of the nanostructures are substantially non-parallel to the surface of the growth substrate. In some cases, the longitudinal axes of the nanostructures are oriented in a substantially perpendicular direction with respect to the surface of the growth substrate. As described more fully below, an advantageous feature of some embodiments of the invention may be that the alignment of nanostructures in the nanostructure forest may be substantially maintained, even upon subsequent processing (e.g., application of a force to the arrangement, transfer of the arrangement to other surfaces, and/or combining the arrangements with secondary materials such as polymers, metals, ceramics, piezoelectric materials, piezomagnetic materials, carbon, and/or fluids, among other materials).

Systems and methods for growing elongated nanostructures (including forests of elongated nanostructures) are described, for example, in International Patent Application Serial No. PCT/US2007/011914, filed May 18, 2007, entitled "Continuous Process for the Production of Nano-structures Including Nanotubes," published as WO 2007/136755 on Nov. 29, 2007; U.S. patent application Ser. No. 12/227,516, filed Nov. 19, 2008, entitled "Continuous Process for the Production of Nanostructures Including Nano-tubes," published as US 2009/0311166 on Dec. 17, 2009; International Patent Application Serial No. PCT/US07/11913, filed May 18, 2007, entitled "Nanostructure-rein-forced Composite Articles and Methods," published as WO 2008/054541 on May 8, 2008; International Patent Appli-cation Serial No. PCT/US2008/009996, filed Aug. 22, 2008, entitled "Nanostructure-reinforced Composite Articles and Methods," published as WO 2009/029218 on Mar. 5, 2009; U.S. patent application Ser. No. 11/895,621, filed Aug. 24, 2007, entitled "Nanostructure-Reinforced Composite Articles and Methods," published as US 2008/0075954 on Mar. 27, 2008; and U.S. Patent Publication No. 2010/0196695, published on Aug. 5, 2010, and filed as application Ser. No. 12/618,203 on Nov. 13, 2009; each of which is incorporated herein by reference in its entirety for all pur-poses. These "forests" can be re-arranged, as described herein, such that a majority of the nanostructures include a longest dimension oriented substantially parallel to the sur-face, and other orientations described herein.

For a given elongated nanostructure in an arrangement of elongated nanostructures, the "nearest neighbor" corre-sponds to the elongated nanostructure having a longitudinal axis that is closest to the longitudinal axis of the given elongated nanostructure at any point along the longitudinal axis of the given elongated nanostructure.

Figure 1B:
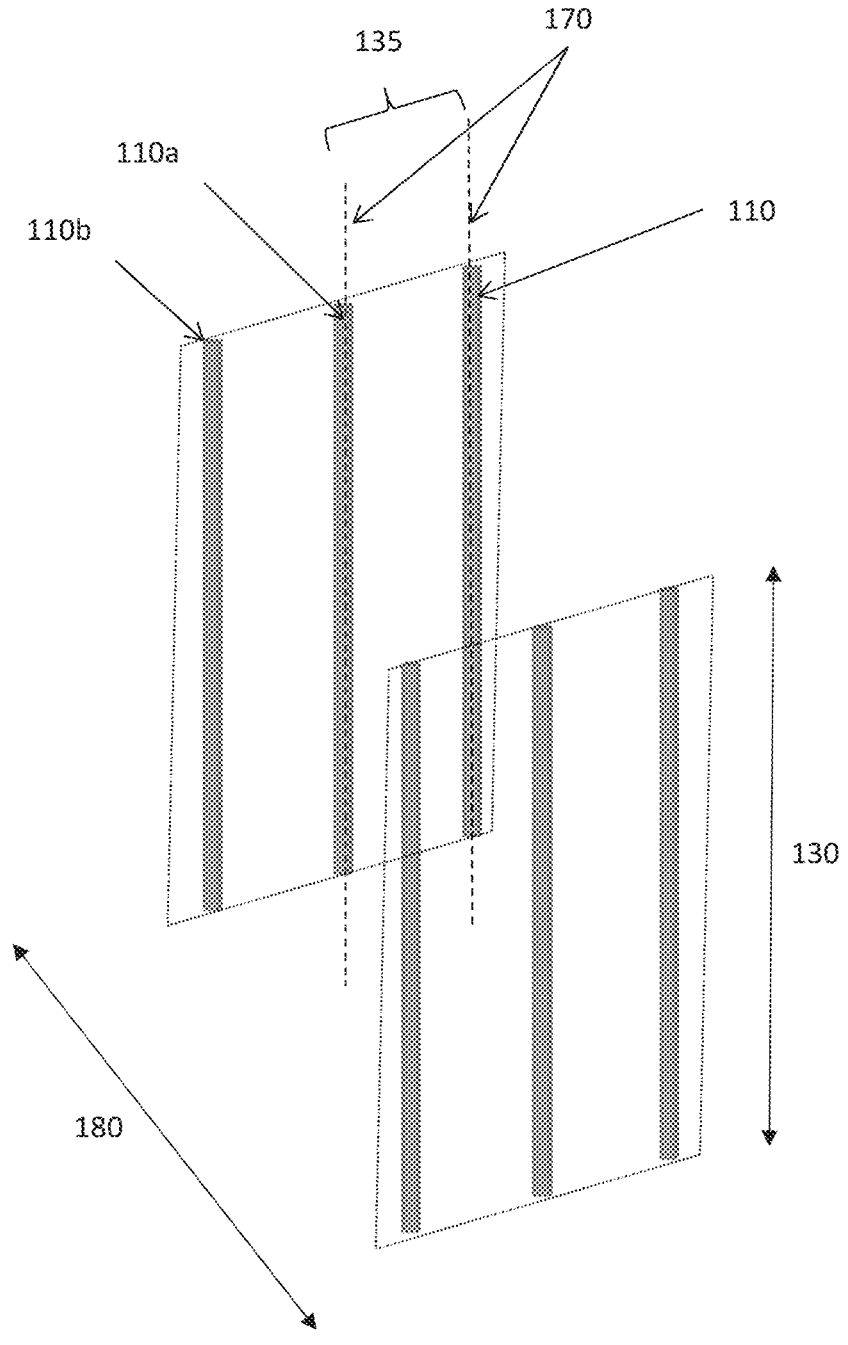
FIG. 1B is a schematic illustration, according to certain embodiments, of a plurality of nanostructures.

In certain embodiments, the arrangement of elongated nanostructures has a number average of nearest neighbor distances that is less than 2.5%, less than 1%, less than 0.5%, less than 0.25%, less than 0.1%, or less than 0.05% of the average length of the elongated nanostructures within the arrangement. For example, as illustrated in FIG. 1B, an arrangement of elongated nanostructures 110 may have a nearest neighbor distance between two elongated nanostruc-tures 135 (e.g., between elongated nanostructure 110 and elongated nanostructure 110a) and an average length 130. In some embodiments, the number average of nearest neighbor distances within the arrangement of elongated nanostruc-tures is less than 250 nanometers, less than 200 nanometers, less than 150 nanometers, less than 100 nanometers, less than 50 nanometers, less than 25 nanometers, less than 10 nanometers, or less than 5 nanometers. In certain embodi-ments, the number average of nearest neighbor distances within the arrangement of elongated nanostructures is greater than or equal to 2 nanometers, greater than or equal to 5 nanometers, greater than or equal to 10 nanometers, greater than or equal to 25 nanometers, greater than or equal to 50 nanometers, greater than or equal to 100 nanometers, greater than or equal to 150 nanometers, or greater than or equal to 200 nanometers. Combinations of the above-refer-enced ranges are also possible (less than 250 nanometers and greater than or equal to 2 nanometers). Other ranges are also possible. The number average of nearest neighbor distances within the arrangement of elongated nanostructures may be calculated by determining the nearest neighbor distance for each nanostructure, then number averaging the nearest neighbor distances. Nearest neighbor distances of the elon-gated nanostructures can be determined by 2- and 3-dimen-sional scanning and transmission electron tomography.

In some embodiments, the nearest neighbor distance within the arrangement is roughly equal for each nanostructure. For example, as illustrated in FIG. 1B, nearest neighbor distance 135 is roughly equal between all nearest neighbor elongated nanostructures in the arrangement. In other embodiments, the nearest neighbor distances for each elon-gated nanostructure may vary.

In some embodiments, the arrangement of elongated nanostructures extends a distance, in each of two orthogonal directions each perpendicular to the longitudinal axes of the nanostructures, that is at least 10 times greater than the number average of nearest neighbor distances within the arrangement.

In some cases, the arrangement of elongated nano struc-tures extends, in two orthogonal directions each perpendicu-lar to the long axes, a distance at least 100 times greater, at least 1000 times greater, at least 10,000 times greater or longer than the number average of the nearest neighbor distances within the arrangement. In certain embodiments, the arrangement of elongated nanostructures extends, in at least one of two orthogonal directions each perpendicular to the long axes, a distance at least $10^6$ times, at least $10^7$ times $10^8$ times, at least $10^9$ times, or at least $10^{10}$ times greater or longer than the number average of nearest neighbor dis-tances within the arrangement.

In some cases, an arrangement of elongated nano struc-tures may be provided such that the arrangement extends, in at least one dimension (e.g., in one dimension, in two orthogonal dimensions, etc.) substantially perpendicular to the long axes, a distance at least 1.5 times greater, at least 2 times greater, at least 5 times greater, at least 10 times greater, at least 25 times greater, at least 100 times greater, or more than a dimension substantially parallel to the longitudinal axes of the elongated nanostructures. As a specific example, the arrangement of elongated nano struc-tures may constitute a thin-film such that the longitudinal axes of the nanostructures are substantially perpendicular to the largest surface of the film.

An arrangement of elongated nanostructures may be provided, in some instances, such that the arrangement extends, in at least one dimension substantially parallel to the long axes (e.g., length dimension 130 in FIG. 1B), a distance at least 1.5 times greater, at least 2 times greater, at least 5 times greater, at least 10 times greater, at least 25 times greater, at least 100 times greater, or more than a dimension substantially perpendicular to the long axes of the elongated nanostructures (e.g., dimension 180 in FIG. 1B). In an alternative embodiment, the arrangement of elongated nanostructures may be provided such that the arrangement extends, in at least one dimension substantially perpendicu-lar to the long axes 170 (e.g., dimension 180 in FIG. 1B), a distance at least 1.5 times greater, at least 2 times greater, at least 5 times greater, at least 10 times greater, at least 25 times greater, at least 100 times greater, or more than a dimension substantially parallel to the long axes 170 of the elongated nano structures.

According to certain embodiments, the elongated nano-structures within the arrangement are substantially aligned. Alignment of the elongated nanostructures as described herein can be determined by 3-dimensional electron tomog-raphy.

In some embodiments, at least 10%, at least 20%, at least 30%, at least 40%, at least 50%, at least 60%, at least 70%, at least 80%, or at least 90% of the elongated nanostructures are parallel to within 30 degrees, within 20 degrees, within 10 degrees, within 5 degrees, or within 2 degrees of a common vector. Those skilled in the art would understand that elongated nanostructures may have some inherent deviation along their length such as waviness. Accordingly, for the purposes of determining the alignment of elongated nanostructures with respect to a common vector, one would draw a line from one end of the elongated nanostructure to the other end of the elongated nanostructure.

In some embodiments, the elongated nanostructures within the arrangement may be closely spaced. For example, the number average of the nearest neighbor distances of the elongated nanostructures within the arrangement may be less than 250 nm, less than 200 nm, less than 100 nm, less than 80 nm, less than 60 nm, less than 40 nm, less than 30 nm, less than 20 nm, less than 10 nm, less than 5 nm, or less. In certain embodiments, the number average of the nearest neighbor distances of the elongated nanostructures within the arrangement may be at least 1 nm, at least 5 nm, at least 10 nm, at least 20 nm, at least 30 nm, at least 40 nm, at least 60 nm, at least 80 nm, at least 100 nm, or at least 200 nm. Combinations of the above-referenced ranges are also possible (e.g., at least 1 nm and less than 250 nm). Other ranges are also possible.

In some cases, the nanostructure materials or the nanocomposites may comprise a high volume fraction of nanostructures. For example, the volume fraction of the nanostructures within the materials may be at least 10%, at least 20%, at least 40%, at least 60%, at least 70%, at least 75%, at least 78%, or higher.

In some cases, the nanostructures are dispersed substantially uniformly within a hardened support material. For example, the nanostructures may be dispersed substantially uniformly within at least 10% of the hardened support material, or, in some cases, at least 20%, 30%, 40%, 50%, 60%, 70%, 80%, 90%, 95%, or 100% of the hardened support material. As used herein, "dispersed uniformly within at least X % of the hardened support material" refers to the substantially uniform arrangement of nanostructures within at least X % of the volume of the hardened support material. The ability to arrange nanostructures essentially uniformly throughout structures comprising plurality of fibers allows for the enhanced mechanical strength of the overall structure.

In certain embodiments, the elongated nanostructures described herein have relatively low geometric tortuosities. For example, in certain embodiments, the arrangement of elongated nanostructures comprises some elongated nanostructures (e.g., at least 10, at least 25, at least 50, at least 100, or at least 1000 elongated nanostructures) with geometric tortuosities of less than 3, less than 2.5, less than 2, less than 1.5, less than 1.2, or less than 1.1 (and, in certain embodiments, down to substantially 1). The geometric tortuosity of a particular elongated nanostructure is calculated as the effective path length divided by the projected path length. One of ordinary skill in the art would be capable of determining the geometric tortuosity of a given elongated nanostructure by examining an image (e.g., a magnified image such as a scanning electron micrograph, a microscope enhanced photograph, or an unmagnified photograph), determining the effective path length by tracing a pathway from one end of the elongated nanostructure to the other end of the elongated nanostructure along the longitudinal axis of the elongated nanostructure, and determining the projected path length by measuring the straight-line distance between the ends of the elongated nanostructure.

According to certain embodiments, the arrangement of elongated nanostructures has an average tortuosity of less than 3, less than 2.5, less than 2, less than 1.5, less than 1.2, or less than 1.1 (and, in certain embodiments, down to substantially 1). The average tortuosity of an arrangement of elongated nansotructures is calculated as the number average of the tortuosities of the individual elongated nanostructures.

According to certain embodiments, at least 50%, at least 75%, at least 90%, at least 95%, or at least 99% of the elongated nanostructures in the arrangement of elongated nanostructures have a tortuosity of less than 3, less than 2.5, less than 2, less than 1.5, less than 1.2, or less than 1.1 (and, in certain embodiments, down to substantially 1).

According to certain embodiments, the arrangement of elongated nanostructures comprises elongated nanostructures having lengths of at least 5 microns, at least microns, at least 100 microns, at least 1 mm, at least 5 mm, at least 10 mm, or at least 100 mm (and/or, in certain embodiments, up to 200 mm, up to 500 mm, up to 1 m, or longer). According to some embodiments, at least 50%, at least 75%, at least 90%, at least 95%, or at least 99% of the elongated nanostructures in the arrangement of elongated nanostructures have lengths of at least 5 microns, at least 10 microns, at least 100 microns, at least 1 mm, at least 5 mm, at least 10 mm, or at least 100 mm (and/or, in certain embodiments, up to 200 mm, up to 500 mm, up to 1 m, or longer).

In some embodiments, an article or device described herein may exhibit a relatively large elastic modulus. In some cases, an arrangement may exhibit a relatively large elastic modulus in a particular direction. For example, in some embodiments, the composite article exhibits a relatively large elastic modulus measured in a direction substantially parallel to the longitudinal axes of the elongated nanostructures. A composite material comprising the elongated nanostructures may have, according to certain but not necessarily all embodiments, improved mechanical properties (e.g., increased strength, increased strain to failure, increased toughness, increased elastic modulus) as compared to the support material alone in a direction substantially parallel to the longitudinal axes of the elongated nanostructures. In certain embodiments comprising an arrangement of elongated nanostructures located at the interface between a first substrate and a second substrate, the arrangement may exhibit increased interlaminar reinforcement across the first and second substrates.

For example, in one set of embodiments, an arrangement (e.g., an arrangement comprising an arrangement of elongated nanostructures) may have an elastic modulus of at least 100 MPa, at least 500 MPa, at least 1 GPa, at least 5 GPa, at least 7.5 GPa, at least 10 GPa, at least 100 GPa, or at least 500 GPa, or higher, measured in a direction substantially parallel to the longitudinal axes of the elongated nanostructures. In some cases, an elastic modulus (in one or more directions) of an arrangement may be at least 2%, at least 5%, 10%, at least 25%, at least 50%, at least 100%, at least 200%, at least 500%, or at least 1000% larger than the elastic modulus that would be exhibited by the support material absent the arrangement of elongated nanostructures, but under otherwise essentially identical conditions. In this context, essentially identical conditions means that the support material, temperature, dimensions, and other parameters of the structure and testing procedure would be substantially the same as the composite material, but the arrangement of elongated nanostructures would not be present. The elastic modulus, as described herein, can be determined using a nanoindenter (e.g., a Nanotest 600 nanomechanical testing system (Micro Materials, UK)) with a Berkovich-type indenter inside the nanoindenter's thermally insulated environmental chamber (25° C.±0.5° C., relative humidity 45%±2%) at a loading and unloading rate of 100 mN/s.

In some embodiments, an arrangement of nanostructures, optionally coated and provided on a substrate surface described herein may exhibit a relatively large electrical conductivity. In some cases, an article may exhibit a relatively large electrical conductivity in a particular direction. For example, in some embodiments, the article exhibits a relatively large electrical conductivity measured in a direction substantially parallel to the longitudinal axes of the elongated nanostructures. A material comprising the arrangement of elongated nanostructures may have, according to certain but not necessarily all embodiments, improved electrical properties (e.g., increased electrical conductivity) as compared to the support material alone in a direction substantially parallel to the longitudinal axes of the elongated nanostructures. In some embodiments, an arrangement (e.g., an arrangement comprising an arrangement of elongated nanostructures) may have an electrical conductivity of at least $10^{-4}$ S/m, $10^{-3}$ S/m, $10^{-2}$ S/m, 0.1 S/m, 1 S/m, 10 S/m, 100 S/m, $10^3$ S/m, $10^4$ S/m, or greater. In some cases, the electrical conductivity of a composite material may be at least 5 times, at least 10 times, at least 50 times, at least 100 times, at least 1000 times, at least 10,000 times, at least 100,000 times, at least 1,000,000 times, at least 10,000,000 times, or at least 100,000,000 times larger than the electrical conductivity that would be exhibited by the support material absent the elongated nanostructures, but under otherwise essentially identical conditions. In this context, essentially identical conditions means that the support material, temperature, dimensions, and other parameters of the structure and testing procedure would be substantially the same as the composite material, but the elongated nanostructures would not be present. Electrical conductivity, as described herein, may be determined using direct current impedance measurements.

As noted above, certain embodiments are related to methods of growing carbon-based nanostructures. According to some embodiments, the method of growing carbon-based nanostructures comprises providing an active growth material or an active growth material precursor and exposing a precursor of the carbon-based nanostructures to the active growth material or active growth material precursor. It should be understood that, where active growth materials and their associated properties are described below and elsewhere herein, either or both of the active growth material itself and the active growth material precursor may have the properties described as being associated with the active growth material. In some embodiments, the active growth material and/or the active growth material precursor has these properties upon being exposed to the carbon-based nanostructure precursor. In certain embodiments, the active growth material and/or the active growth material precursor has these properties at the beginning of a heating step used to form the carbon-based nanostructures. In certain embodiments, the active growth material and/or the active growth material precursor has these properties at at least one point in time during which the material is in a chamber or other vessel within which the carbon-based nanostructures are grown.

It should be understood that the growth of carbon-based nanostructures can include the initial nucleation/formation of the carbon-based nanostructure and/or making an existing carbon-based nanostructure larger in size. In certain embodiments, the growth of the carbon-based nanostructures comprises nucleating or otherwise forming the carbon-based nanostructures from material that is not a carbon-based nanostructure. In some embodiments, two or more carbon-based nanostructures may nucleate or otherwise form from a material that is not a carbon-based nanostructure. The two or more carbon-based nanostructures may be the same type of carbon-based nanostructure, or may be different types of carbon-based nanostructures. In some embodiments, the growth of the carbon-based nanostructures comprises making an existing carbon-based nanostructure larger in size. The growth process can also include both of these steps, in some cases. In certain embodiments, multiple growth steps can be performed, for example, using a single active growth material to grow carbon-based nanostructures multiple times.

The precursor of the carbon-based nanostructures can be exposed to the active growth material in a number of ways. Generally, exposing the active growth material to the precursor comprises combining the precursor and the active growth material with each other such that they are in contact. According to certain embodiments, exposing the precursor of the carbon-based nanostructures to the active growth material comprises adding the precursor of the carbon-based nanostructures to the active growth material. In certain embodiments, exposing the precursor of the carbon-based nanostructures to the active growth material comprises adding the active growth material to the precursor of the carbon-based nanostructures. In still other embodiments, the precursor of the carbon-based nanostructures and the active growth material can be mixed simultaneously. Other methods of exposure are also possible. Exposing the precursor of the carbon-based nanostructures to an active growth material can occur, according to some embodiments, in a chamber or other volume. The volume in which the precursor of the carbon-based nanostructures is exposed to the active growth material may be fully enclosed, partially enclosed, or completely unenclosed.

According to certain embodiments, carbon from the precursor of the carbon-based nanostructures may be dissociated from the precursor. The dissociation of the carbon from the precursor can, according to certain embodiments, involve the breaking of at least one covalent bond. In other cases, the dissociation of the carbon from the precursor does not involve breaking a covalent bond. The carbon dissociated from the precursor may, according to certain embodiments, chemically react to grow the carbon-based nanostructures via the formation of new covalent bonds (e.g., new carbon-carbon covalent bonds). In the growth of carbon nanotubes, for example, the nanostructure precursor material may comprise carbon, such that carbon dissociates from the precursor molecule and may be incorporated into the growing carbon nanotube via the formation of new carbon-carbon covalent bonds.

As described in more detail below, a variety of materials can be used as the precursor of the carbon-based nanostructures and as the active growth material (or a precursor of the active growth material). According to certain embodiments, carbon-based nanostructures (e.g., carbon nanotubes) may be synthesized using $CO_2$ and acetylene as precursors of the carbon-based nanostructures. Other examples of nanostructure precursor materials, active growth materials, precursors of active growth materials, and the types of carbon-based nanostructures that may be grown using these materials are described in more detail below.

In some embodiments, the method of growing carbon-based nanostructures comprises exposing the active growth material and the precursor of the carbon-based nanostructures to a set of conditions that causes growth of carbon-based nanostructures on the active growth material. Growth of the carbon-based nanostructures may comprise, for example, heating the precursor of the carbon-based nanostructures, the active growth material, or both. Other examples of suitable conditions under which the carbon-based nanostructures may be grown are described in more detail below. In some embodiments, growing carbon-based nanostructures comprises performing chemical vapor deposition (CVD) of nanostructures on the active growth material. In some embodiments, the chemical vapor deposition process may comprise a plasma chemical vapor deposition process. Chemical vapor deposition is a process known to those of ordinary skill in the art, and is explained, for example, in Dresselhaus M S, Dresselhaus G., and Avouris, P. eds. "Carbon Nanotubes: Synthesis, Structure, Properties, and Applications" (2001) Springer, which is incorporated herein by reference in its entirety. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

In some cases, the nanostructures may be removed from a substrate after the nanostructures are formed. For example, the act of removing may comprise transferring the nanostructures directly from the surface of the substrate to a surface of a receiving substrate. The receiving substrate may be, for example, a polymer material or a carbon fiber material. In some cases, the receiving substrate comprises a polymer material, metal, or a fiber comprising $Al_2O_3$, $SiO_2$, carbon, or a polymer material. In some cases, the receiving substrate comprises a fiber comprising $Al_2O_3$, $SiO_2$, carbon, or a polymer material. In some embodiments, the receiving substrate is a fiber weave.

Removal of the nanostructures may comprise application of a mechanical tool, mechanical or ultrasonic vibration, a chemical reagent, heat, or other sources of external energy, to the nanostructures and/or the surface of the growth substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth substrate. Systems and methods for removing nanostructures from a substrate, or for transferring nanostructures from a first substrate to a second substrate, are described in International Patent Application Serial No. PCT/US2007/011914, filed May 18, 2007, entitled "Continuous Process for the Production of Nanostructures Including Nanotubes," which is incorporated herein by reference in its entirety.

In some embodiments, the active growth material may be removed from the growth substrate and/or the nanostructures after the nanostructures are grown. Active growth material removal may be performed mechanically, for example, via treatment with a mechanical tool to scrape or grind the active growth material from a surface (e.g., of a substrate). In some cases, the first active growth material may be removed by treatment with a chemical species (e.g., chemical etching) or thermally (e.g., heating to a temperature which evaporates the active growth material). For example, in some embodiments, the active growth material may be removed via an acid etch (e.g., HCl, HF, etc.), which may, for example, selectively dissolve the active growth material. For example, HF can be used to selectively dissolve oxides. In some embodiments, the first active growth material may be removed by a combination of treatment with a chemical species and treatment with heat (e.g., the first active growth material may be heated in the presence of $H_2$). When heating is employed to remove the first active growth material, it may be applied by exposing the active growth material to a heated environment and/or by using an electron beam to heat the active growth material.

While growth of nanostructures using a growth substrate has been primarily described above in detail, the embodiments described herein are not so limited, and carbon-based nanostructures may be grown, in some embodiments, on an active growth material in the absence of a growth substrate. For example, active growth material can be placed under a set of conditions selected to facilitate nanostructure growth in the absence of a substrate in contact with the active growth material. Nanostructures may grow from active growth material as the active growth material is exposed to the growth conditions. In some embodiments, the active growth material, or a precursor thereof, may be suspended in a fluid. For example, an active growth material, or a precursor thereof, may be suspended in a gas (e.g., aerosolized) and subsequently exposed to a carbon-containing precursor material, from which carbon nanotubes may be grown. In some cases, the active growth material, or a precursor thereof, may be suspended in a liquid (e.g., an alcohol that serves as a nanostructure precursor material) during the formation of the nanostructures. In some embodiments, unsupported active growth materials, or precursors thereof, are in contact with a gas or vacuum at every point comprising their surfaces. Active growth materials having a variety of shapes are contemplated, including hemispherical shapes, spherical shapes, polygonal shapes, and the like.

As used herein, "nanostructure," refers to an article with at least one cross-sectional dimension of less than 1 micron. In some cases, the nanostructure may have at least one cross-sectional dimension of less than 500 nm, less than 250 nm, less than 100 nm, less than 10 nm, less than 5 nm, less than 3 nm, less than 2 nm, less than 1 nm, between 0.3 and 10 nm, between 10 nm and 100 nm, or between 100 nm and 1 micron.

In some embodiments, the substrate may comprise carbon (e.g., amorphous carbon, carbon aerogel, carbon fiber, graphite, glassy carbon, carbon-carbon composite, graphene, aggregated diamond nanorods, nanodiamond, diamond, and the like).

In accordance with certain embodiments, the substrate (e.g., on which the active growth material, or a precursor thereof, and/or the carbon-based nanostructures are supported) comprises a fiber. For example, in some embodiments, the active growth material, active growth material precursor, and/or carbon-based nanostructures are supported on a carbon fiber. In certain embodiments, the active growth material, active growth material precursor, and/or carbon-based nanostructures are supported on a glass fiber. In accordance with some embodiments, the active growth material, active growth material precursor, and/or carbon-based nanostructures are supported on fibers comprising one or more of the following materials: carbon; carbon glass; glass; alumina; basalt; metals (e.g., steel, aluminum, titanium); aramid (e.g., Kevlar®, meta-aramids such as Nomex®, p-aramids); liquid crystalline polyester; poly(p-phenylene-2,6-benzobisoxazole) (PBO); polyethylene (e.g., Spectra®; poly{2,6-diimidazo[4,5-b:4',5'-e]pyridinylene-1, 4-(2,5-dihydroxy)phenylene}; and combinations of these. In some embodiments, the active growth material, active growth material precursor, and/or carbon-based nanostructures are supported on fibers comprising at least one of polyetherether ketone (PEEK) and polyether ketone (PEK).

For example, in FIG. 1A, substrate 102 is an elongated substrate, and can correspond to, for example, a fiber such as a carbon fiber. Substrate 102 can be in direct contact with an active growth material. In some such embodiments, carbon-based nanostructures 110 can be grown from a precursor on an active growth material.

As noted above, in some embodiments, the active growth material, active growth material precursor, and/or carbon based nanostructures are supported on a carbon fiber (e.g., a sized carbon fiber or an unsized carbon fiber). Any suitable type of carbon fiber can be employed including, for example, aerospace-grade carbon fibers, auto/sport grade carbon fibers, and/or microstructure carbon fibers. In certain embodiments, intermediate modulus (IM) or high modulus (HM) carbon fibers can be employed. In some embodiments, poly(acrylonitrile)-derived carbon fibers can be employed. Certain embodiments of the invention are advantageous for use with carbon fibers that carry a large degree of their tensile strengths in their outer skins (e.g., fibers in which at least 50%, at least 75%, or at least 90% of the tensile strength is imparted by the portion of the fiber located a distance away from the outer skin of the fiber of less than 0.1 times or less than 0.05 times the cross-sectional diameter of the fiber), such as aerospace grade intermediate modulus carbon fibers.

According to certain embodiments, the growth substrate can be a prepreg.

In certain embodiments, the substrate can be a carbon-based substrate. In some embodiments, the carbon-based growth substrate contains carbon in an amount of at least 75 wt %, at least 90 wt %, at least 95 wt %, or at least 99 wt %. That is to say, in some embodiments, at least 75 wt %, at least 90 wt %, at least 95 wt %, or at least 99 wt % of the carbon-based growth substrate is made of carbon.

According to certain embodiments, the thickness of the pseudocapacitive material can be relatively consistent over the underlying nanostructures. For example, in certain embodiments, the thickness of the pseudocapacitive material, over at least 80% of the surface area of the nanostructure that is covered by the material, does not deviate from the average thickness of the material by more than 50%, more than 40%, more than 30%, more than 20%, more than 10%, or more than 5%. In some embodiments, the thickness of the material, over at least 90% (or at least 95%, at least 98%, or at least 99%) of the surface area of the nanostructure that is covered by the material, does not deviate from the average thickness of the material by more than 50%, more than 40%, more than 30%, more than 20%, more than 10%, or more than 5%.

The average thickness of the pseudocapacitive material coating can be, according to certain embodiments, relatively thin. For example, according to certain embodiments, the average thickness of the material can be less than 1 micron, less than 500 nm, less than 200 nm, less than 100 nm, less than 50 nm, or less than 10 nm (and/or, in certain embodiments, as little as 1 nm, as little as 0.1 mm, or less).

The following example is intended to illustrate certain embodiments of the present invention, but does not exemplify the full scope of the invention.

EXAMPLE

This example describes the fabrication of flexible densified horizontally-aligned CNT arrays (HACNTs) having conformally-coated poly(3-methylthiophene) (P3MT) conducting polymer to impart pseudocapacitance.

In this example, a two-step method to fabricate highly flexible densified horizontally-aligned CNT arrays (HACNTs)/conformally-coated poly(3-methylthiophene) (P3MT) CP as supercapacitor electrodes with a tailored nanoporous morphology was employed. Starting with vertically-aligned CNTs (A-CNTs), a one-step mechanical rolling treatment was used to create horizontally-aligned CNTs (HACNTs). Next, a dry process via modified oxidative chemical vapor deposition (o-CVD) was employed to conformally deposit P3MT on the HACNTs. It is noted that the alignment in the CNTs network was preserved after polymer deposition, preserving the aligned channels between HACNTs coated with CP, which enhances the conductivity and electrochemical performances of the as-assembled cell, as expected. In this configuration, P3MT/HACNT flexible electrodes show extremely high areal capacitance of 3.1 F $cm^{-2}$ at 5 mA $cm^{-2}$ compared with those in most extant works. Thanks to the aligned ionic transport channels, the electrodes also exhibit high areal capacitance retention with 1.8 F $cm^{-2}$ even at a current density as high as 200 mA $cm^{-2}$. Such performance retention at high current density has not been previously reported. The composite electrode was then used to assemble a flexible asymmetric supercapacitor cell with much higher cell capacitance, energy and power densities compared to most state-of-the-art flexible cells. Furthermore, due to the high mechanical strength of HACNTs, the electrochemical performances of the cell changed very little upon severe bending, demonstrating real potential application in flexible and wearable electronics.

Results and Discussion

Figure 3A:
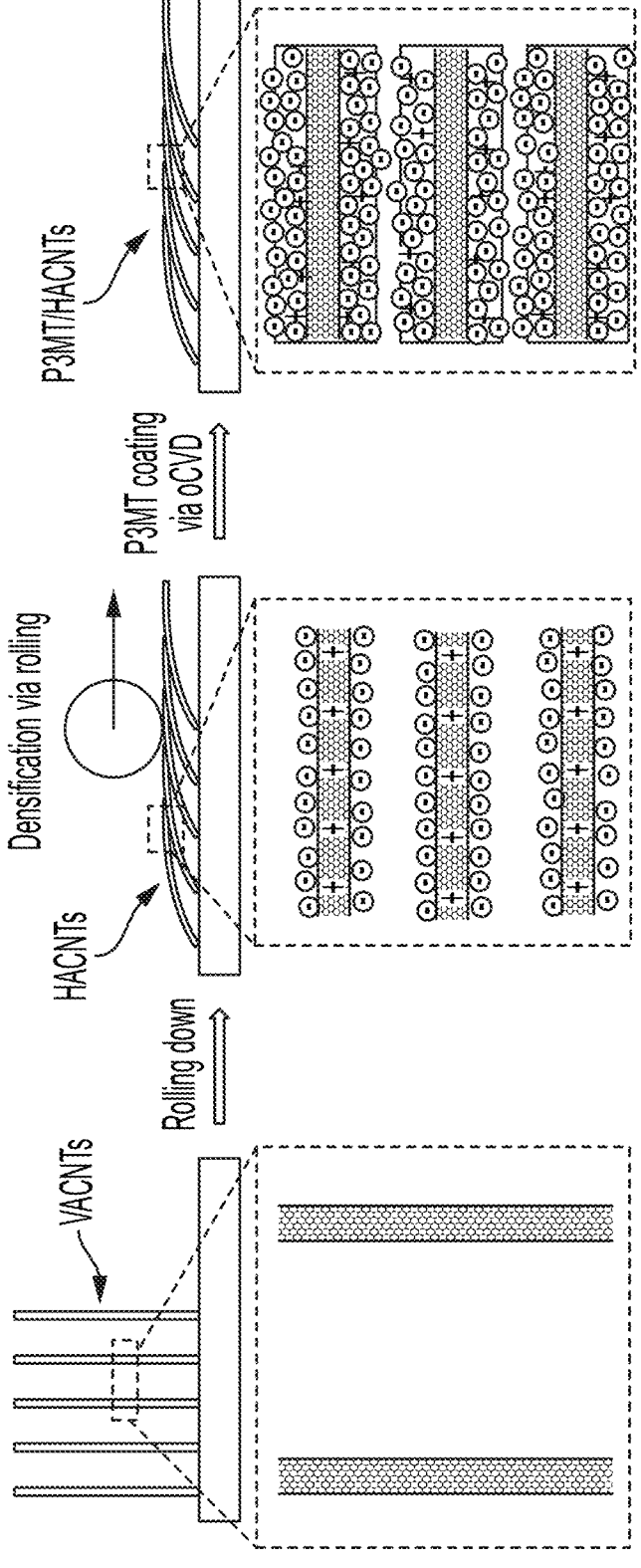
Figure 3D:
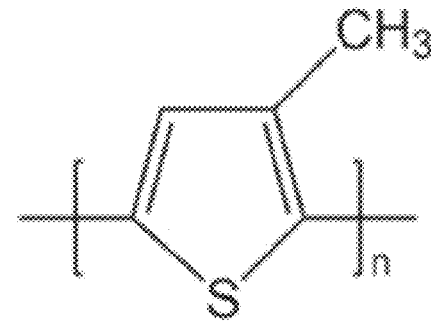
Figure 3D:
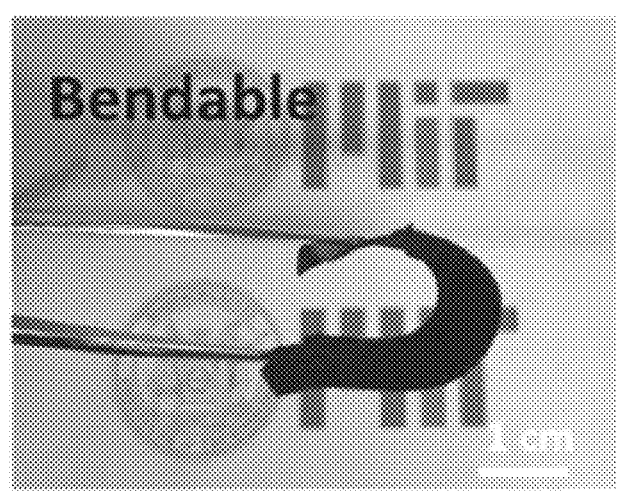
Figure 3D:
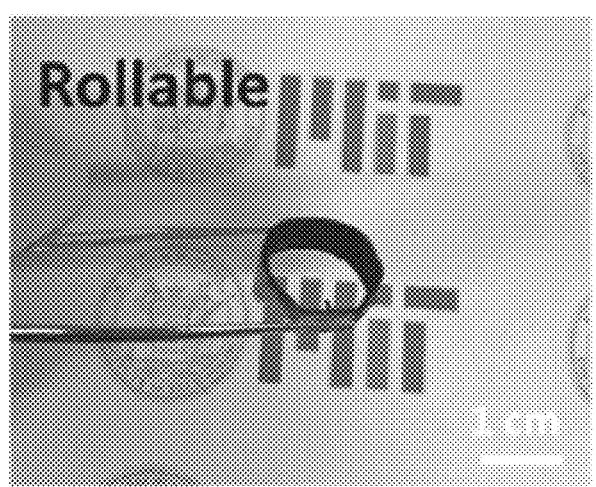

The fabrication process of the flexible P3MT/HACNTs electrode is illustrated in FIG. 3A. A-CNTs are synthesized by thermal catalytic chemical vapor deposition (CVD) on silicon wafers, which was reported in prior works. (See, e.g., B. L. Wardle, et al., *Advanced Materials*, "Fabrication and characterization of ultrahigh-volume-fraction aligned carbon nanotube-polymer composites," 2008, 20, 2707-2714; and I. Y. Stein et al., "Mesoscale evolution of non-graphitizing pyrolytic carbon in aligned carbon nanotube carbon matrix nanocomposites," *Journal of Materials Science,* 2008, 52, 13799-13811, each of which is incorporated herein by reference in its entirety for all purposes.) These CNT arrays have a highly aligned nanostructure with approximately 1% volume fraction ($V_f$), corresponding to ~80 nm inter-CNT spacing and an average CNT diameter of 8 nm. Then a facile one-step treatment was employed to convert the vertical aligned CNT arrays to horizontally aligned CNT arrays (HACNTs). In this process, a Teflon roller or razor blade was used to roll the CNT arrays along the horizontal alignment direction as shown in the middle of FIG. 3A. Meanwhile, CNT arrays have been densified by ~12X ($V_f$=12 vol %) as determined by the thickness after densification. Based on some prior studies, increasing the density of the nanostructured electrode gives rise to high volumetric electrochemical performance. (See Y. Zhou et al., *Electrochimica Acta,* 2013, 111, 608-613.) To increase the areal capacitance, P3MT CP was deposited conformally on the CNT via oCVD process. oCVD is a unique coating technique for the deposition of CPs not only because nearly any substrate can be used (unlike electrochemical deposition which requires electrically conductive substrate) but also it can lead to nanoscale controllable homogeneous and conformal coatings. (See, e.g., N. Lachman et al., "Tailoring thickness of conformal conducting polymer decorated aligned carbon nanotube electrodes for energy storage," *Advanced Materials Interfaces,* 2014, 1, 1400076, which is incorporated herein by reference in its entirety for all purposes). During the oCVD process, the coated polymerized thin films can be formed via simultaneous exposure to vapor-phase monomer (3MT) and oxidant (FeCl$_3$) without the need for either a solvent or the potential/current used in electrochemical deposition. P3MT is a very promising new CP for supercapacitor electrodes although very few works have been reported. Based on the chemical structure in FIG. 3B, with only one methyl as the side group of the thiophene ring, P3MT demonstrates higher density of effective conjugation (polythiophene structure) than other modified polythiophene-like polymers, such as PEDOT and poly(3-hexylthiophene) (P3HT). Therefore, the P3MT CP coating is well-suited chemically to enhance the electrochemical performance of the composite electrode. In addition, 3-methyl thiophene also has much lower vapor pressure compared to thiophene, which significantly facilitates the adsorption of monomer molecules on the substrate in the oCVD process. FIG. 3A also illustrates the difference in the ion storage and transport processes between the uncoated HACNTs and the P3MT/HACNTs. In the HACNTs electrodes, the ions are only stored on the surface of A-CNTs (electrochemical double layer type) and excess ions will travel through the ion pathways formed by the HACNTs during the charge/discharge processes. By contrast, in the P3MT/HACNTs electrodes, the ions travel into the redox material (P3MT films) during the charging process to store more ions based on the pseudocapacitive working mechanism, leading to increased specific capacitance and energy density. In addition, the P3MT/HACNTs electrode also shows excellent bendable and rollable properties as shown in the digital images in FIGS. 3C and 3D. This flexibility can be attributed to the HACNT strength as well as the conformal coating of CP via the unique oCVD process.

Figure 4A:
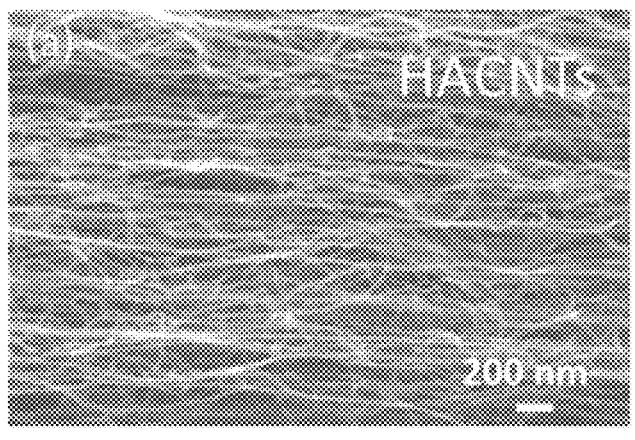
FIGS. 4A-4D show, according to certain embodiments, properties of a P3MT/HACNT nanocomposite and HACNTs.
Figure 4B:
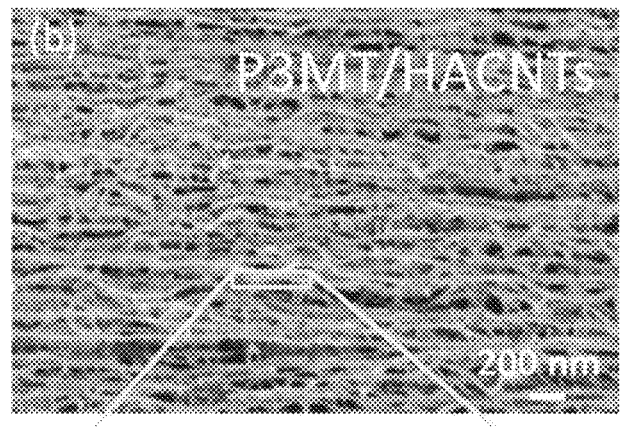
Figure 4C:
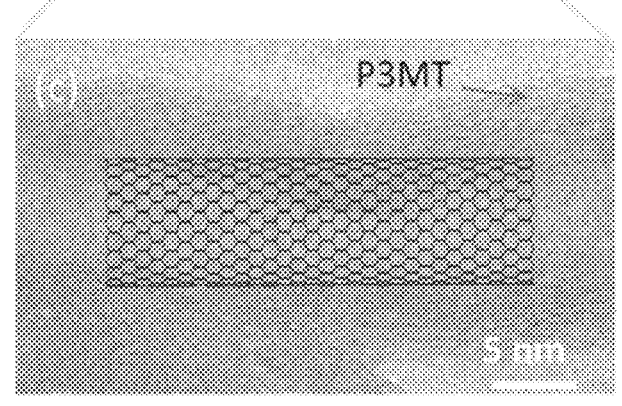
Figure 4D:
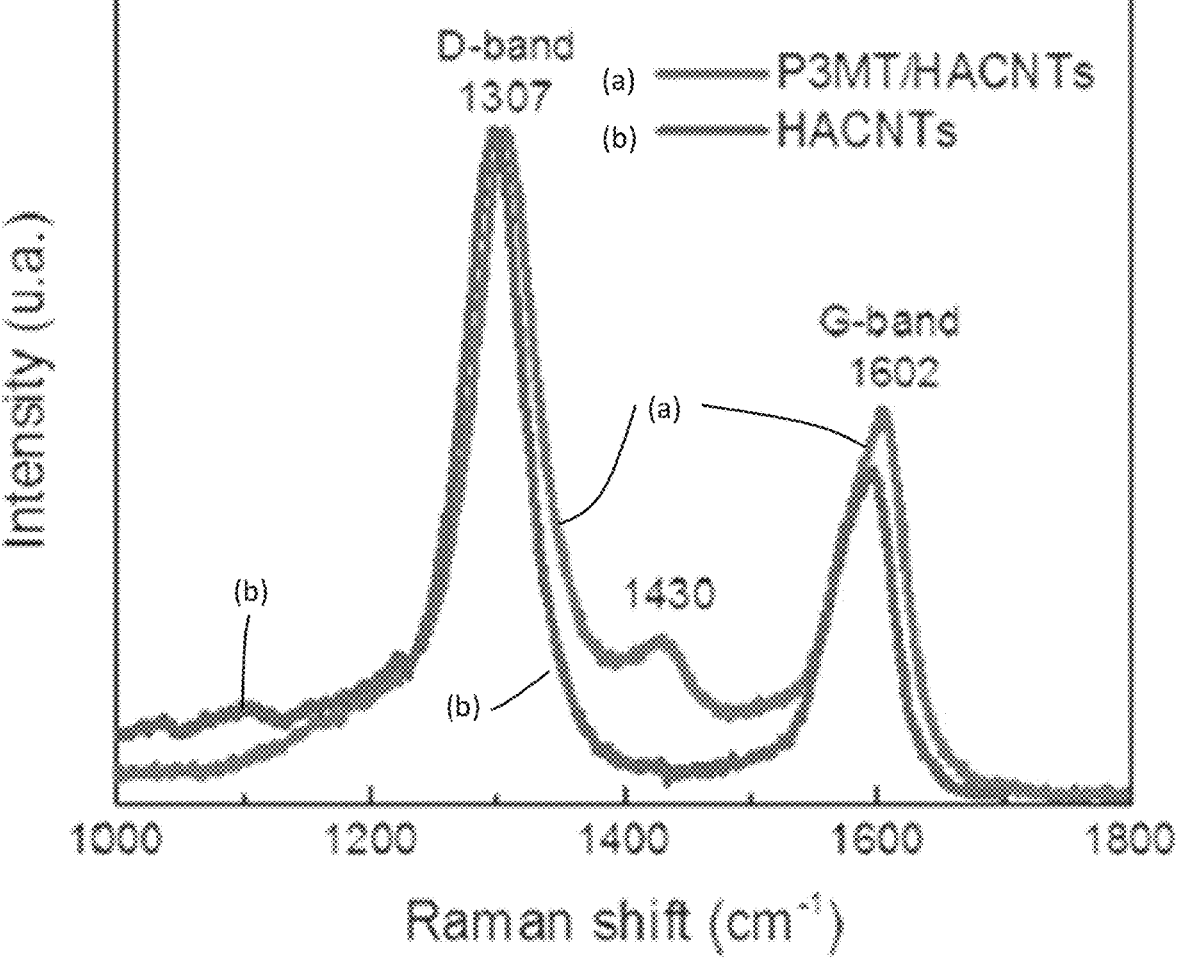

The nanomorphology of HACNTs and P3MT/HACNTs nanocomposite was investigated by scanning electron microscopy (SEM) and Transmission electron microscopy (TEM) with exemplary images shown in FIGS. 4A and 4B, and FIG. 4C respectively. Based on the images, one can clearly find that the P3MT was conformally coated on the nanotubes and the horizontally aligned CNTs are maintained after oCVD process. The diameter of the nanofibers increased to ~18 nm after coating and hence the coating thickness of P3MT can be determined as ~5 nm considering the synthesized CNT has diameter of 8 nm. The consequence of thicker nanofibers after coating corresponds to a decrease in the average spacing between the nanofibers in the densified HACNTs from 23 nm to 5 nm, which allows ion transport and provides enough space for volume change of the CP during the doping and de-doping pseudocapacitance processes. This conformal and homogeneous coating around the HACNTs is highly desirable for the electrochemical performance of assembled supercapacitor cell since it allows for a stress-free large-volume/strain change of CP during the charging/discharging processes, avoiding collapse of the electrodes. Hence, this unique electrode nanomorphology can support long cycling times. The composite phase and structural features were also characterized by Raman spectroscopy. As shown in FIG. 4D, two prominent peaks can be found at ~1307 cm$^{-1}$ and 1602 cm$^{-1}$, representing the D and G bands for CNTs. The D band expresses the vibration of the disordered carbon structure while G band shows the sp$^2$-bonded carbon atoms. The peak at 1430 cm$^{-1}$ in Raman spectra can be attributed to the presence of P3MT.

Figure 5A:
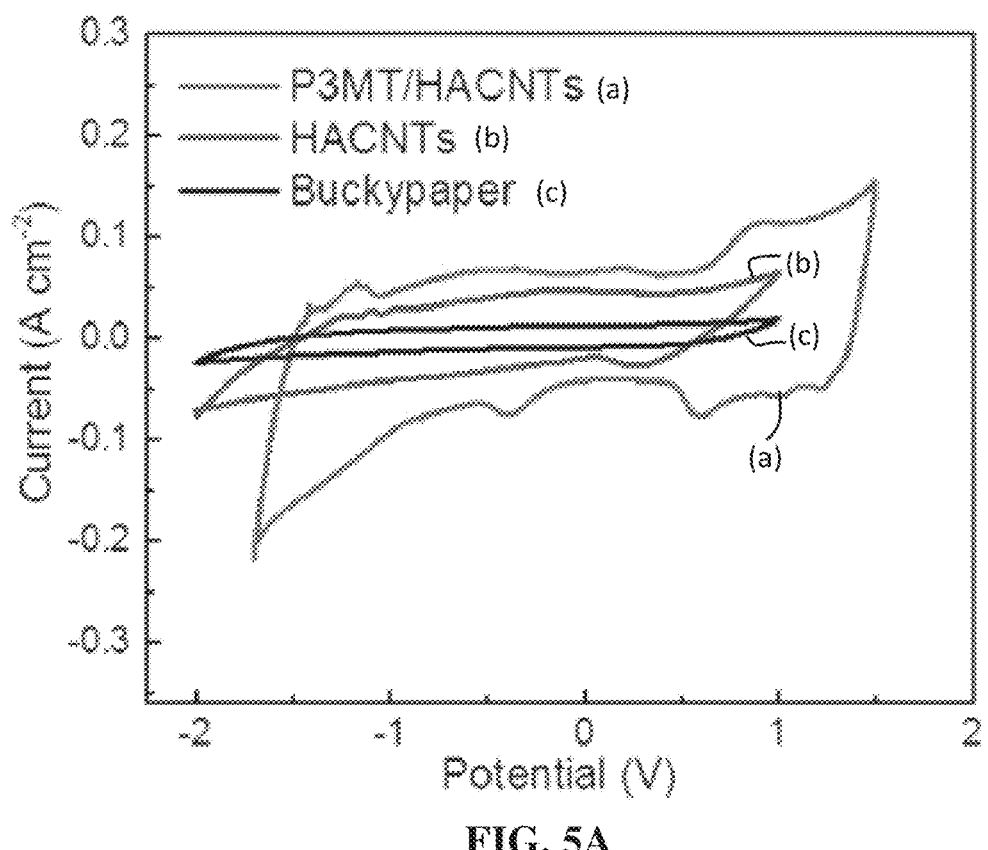
FIGS. 5A-5B are, according to certain embodiments, plots showing electrochemical performance of single electrode comprised of a P3MT/HACNTs composite, HACNT film, and buckypaper.
Figure 8:
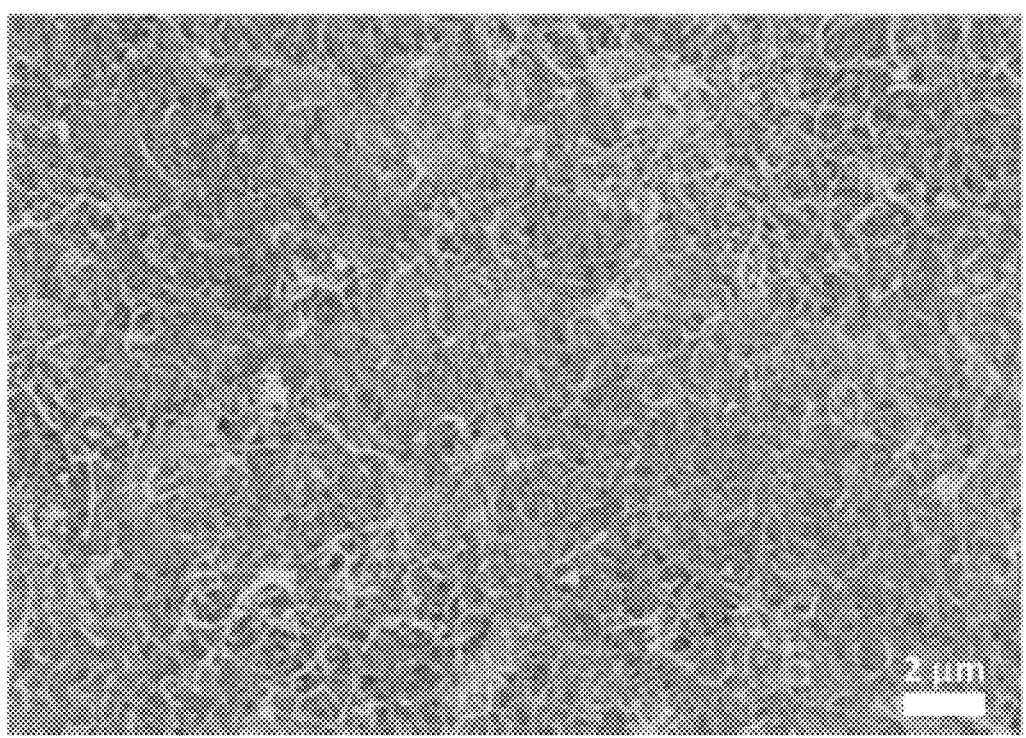
FIG. 8 is, according to some embodiments, a scanning electron microscope (SEM) image of buckypaper with random-dispersed carbon nanotubes.

The electrochemical properties of the P3MT/HACNTs composite electrode and HACNTs electrode were then characterized in a three-electrode configuration using 1 M tetraethylammonium tetrafluoroborate/propylene carbonate (Et4NBF4/PC) as the electrolyte. As a comparison, CNT buckypapers that have been utilized as flexible supercapacitor electrode substrates in state-of-the-art works were also synthesized based on a procedure reported before. (See M. Endo et al. *Nature,* 2005, 433, 476.) As shown in the SEM image in FIG. 8, contrary to our HACNTs, the CNTs in the buckypaper are randomly dispersed. FIG. 5A presents the cyclic voltammetry (CV) scan curves of these three electrode types at a scan rate of 100 mV s$^{-1}$. The CV curves of HACNTs and buckypaper electrodes show stable electrochemical windows (ECW) between -2 V to 1 V, while the CV curve of the composite electrode shifted and expanded to between -1.7 V to 1.5 V due to the pseudocapacitive redox reactions dominated from P3MT during the charging/discharging process. The small peaks in the CV curve of the nanocomposite P3MT/HACNTs electrode in FIG. 5A is a further indicator of the redox reactions. Based on the enclosed area of the CV curves, the areal capacitance of HACNTs is ~2× greater than that of buckypaper, indicating the superior properties of the well-aligned nanostructure of HACNTs. The composite electrode exhibits ~2× and ~8× greater in areal capacitance compared with HACNTs and buckypaper respectively, which can be due to the high capacitance of the novel P3MT CP, as shown in FIG. 5A.

Figure 5B:
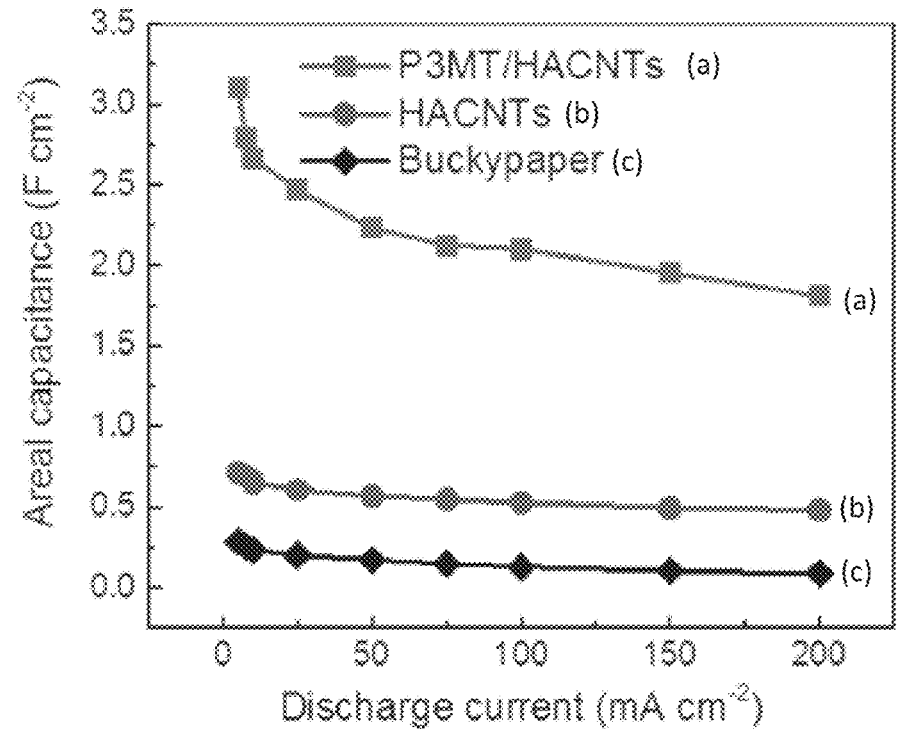
Figure 9:
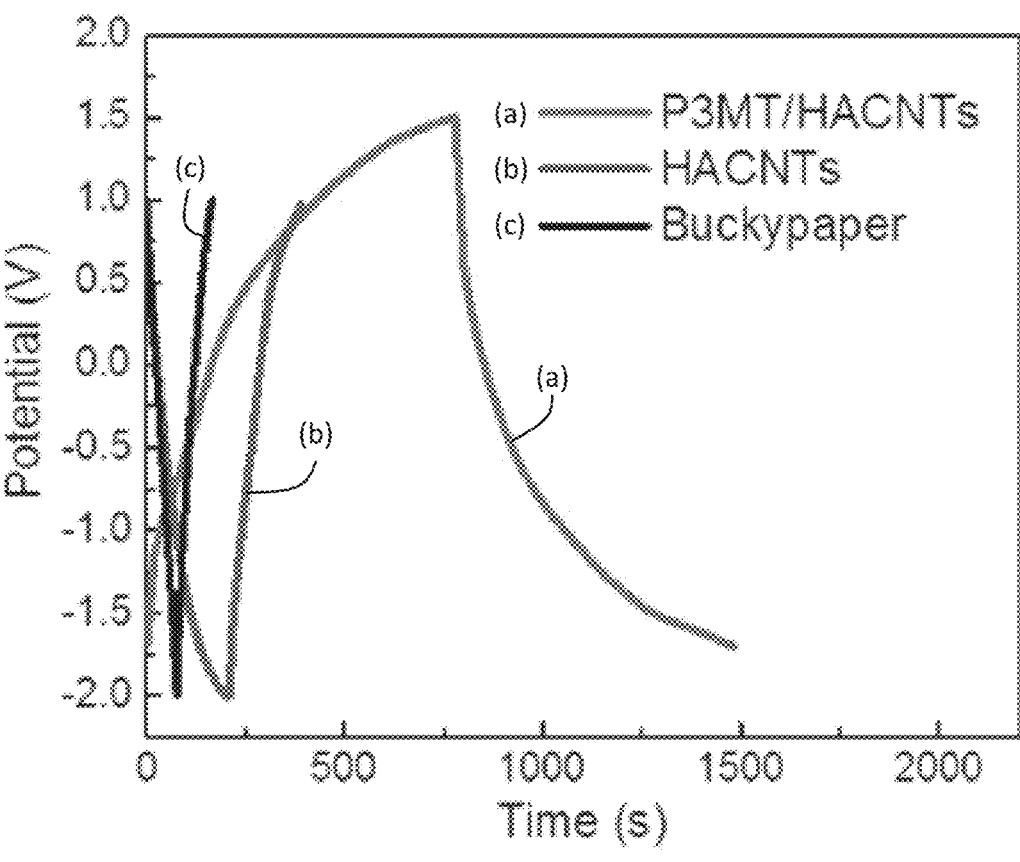
FIG. 9 is, according to certain embodiments, a plot showing GCD curves of different electrodes at alternating current densities of 10 mA cm$^{-2}$ and –10 mA cm$^{-2}$.

Galvanostatic charge/discharge (GCD) tests were then carried out on the three electrodes under various current densities. FIG. 9 shows the GCD curves at alternating current densities of 10 mA cm$^{-2}$ and -10 mA cm$^{-2}$. The areal capacitance can be calculated by the equation C=I/(dV/dt) (where I is the discharge current density; t is the discharge time and V is the potential) and the areal capacitance obtained as exhibited in FIG. 5B. Consistent with the data from the CV curves, P3MT/HACNTs nanocomposite electrodes exhibits the highest areal capacitance while the lowest one was achieved for the buckypaper. The buckypaper also exhibits relatively poor capacitance retention of ~29% from 0.29 F cm$^{-2}$ to 0.085 F cm$^{-2}$ when increasing the current density from 5 mA cm$^{-2}$ to 200 mA cm$^{-2}$. By contrast, the HACNTs electrode shows much higher areal capacitance retention of ~67% from 0.72 F cm$^{-2}$ to 0.48 F cm$^{-2}$ for the same current range, consistent with expectations due to the advantaged micro- and nano-morphologies of the well-aligned nanostructure of HACNTs that allows the ions to have enough time to transport into the interior of the electrode even in short time/at high speed (high current density). Hence, the high areal capacitance can be still maintained at high current density. After coating with P3MT via the oCVD method, the areal capacitance of the composite electrode at 5 mA cm$^{-2}$ increases further to as high as 3.11 F cm$^{-2}$, which is much higher (from two orders to several time higher) than that of many other flexible electrodes reported so far. (See, e.g., S. Wang et al., *Small,* 2017, 13, 1603330; Y. Ko et al., *Nature communications,* 2017, 8, 536; X. Liu et al. *Small,* 2018, 14, 1702641; Y. Bu et al., *Electrochimica Acta,* 2018, 271, 624-631; S. Zeng et al., *Journal of Materials Chemistry A,* 2015, 3, 23864-23870; H. Moon et al., *Scientific reports,* 2017, 7, 41981; and N. Wang et al., *Journal of Power Sources,* 2018, 395, 228-236.) After increasing the current density by 40× to 200 mA cm$^{-2}$, the nanocomposite electrode can still exhibit 1.81 F cm$^{-2}$ with capacitance retention more than 58%. To the best of our knowledge, this is the first work to retain high (above 1 F cm$^{-2}$) areal capacitance at such a high (200 mA cm$^{-2}$) current density. The high electrochemical performance of the nanocomposite electrode under high current density is next shown to contribute to high power density of the assembled cell.

Figure 6A:
FIGS. 6A-6E illustrate, according to some embodiments, electrochemical performance of assembled asymmetric supercapacitor cells based on P3MT/HACNT and HACNT electrodes.
Figure 6B:
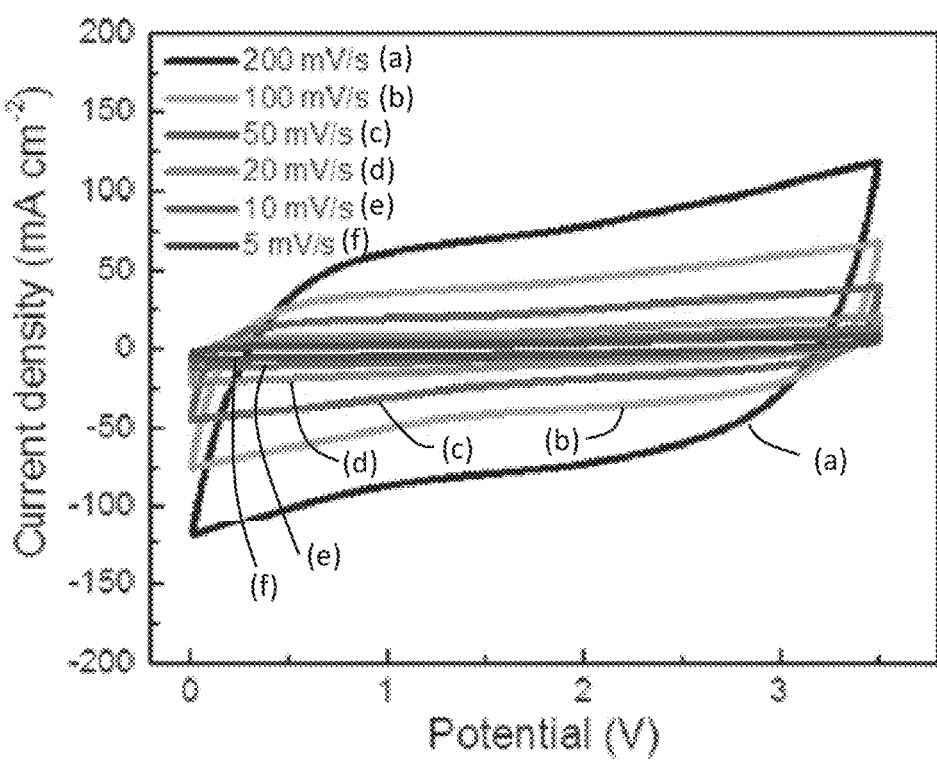
Figure 6C:
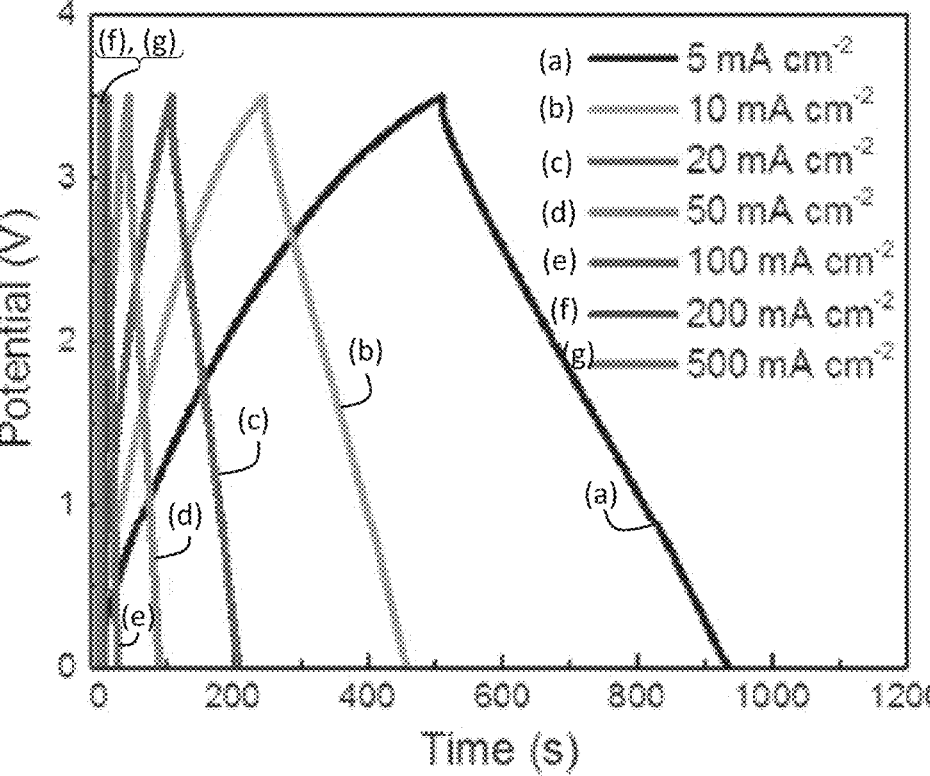
Figure 6D:
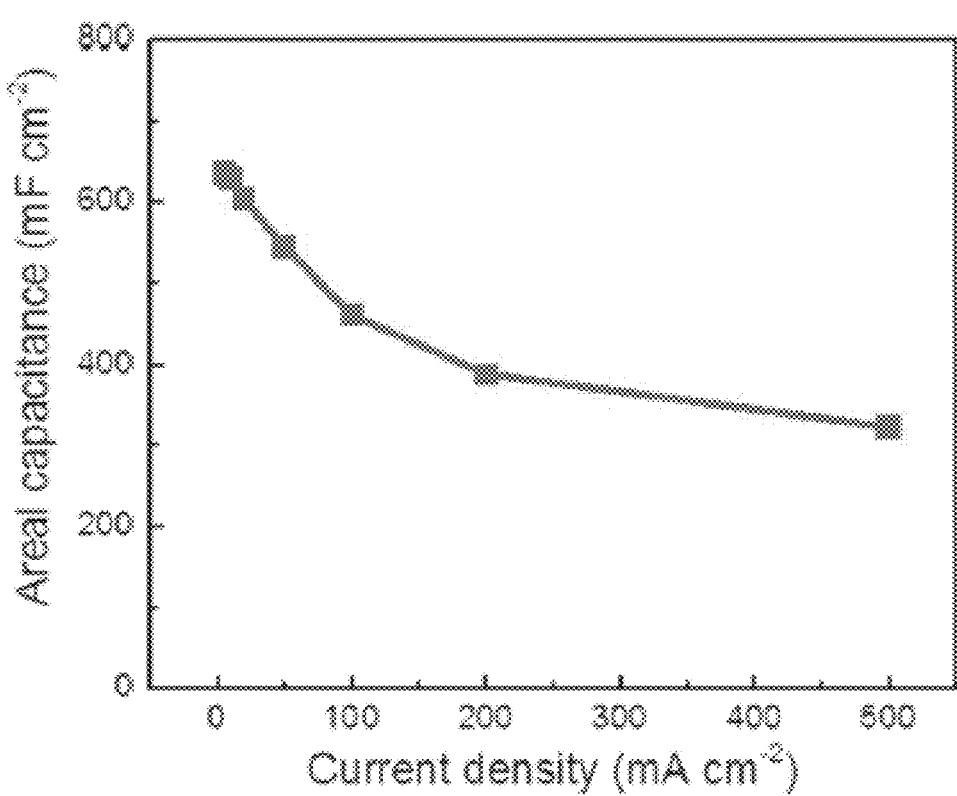
Figure 6E:
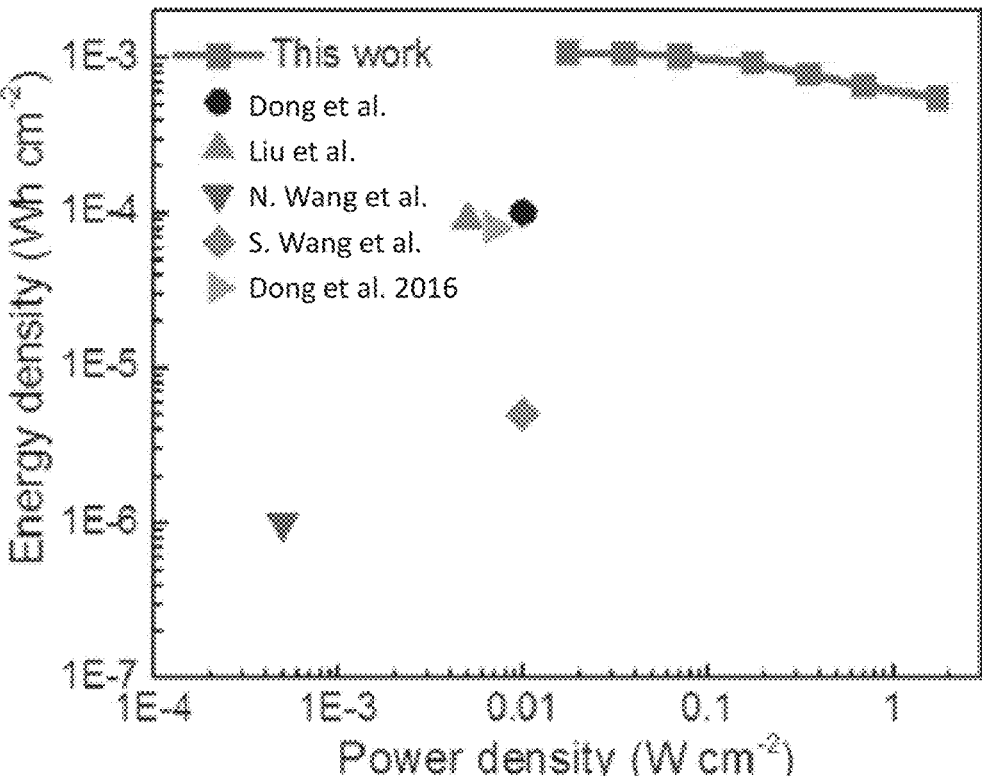

To further explore the potential of the HACNT and P3MT/HACNT electrodes, flexible asymmetric supercapacitor cells were assembled with P3MT/HACNTs nanocomposites as the positive electrode, and HACNTs as the negative electrode. FIG. 6A exhibits the sandwich structure of the flexible cell including two asymmetric electrodes and a porous separator. The entire cell was encapsulated in polydimethylsiloxane (PDMS) as a flexible substrate and thin copper foils were used as the current collectors (see Experimental section for details). FIG. 6B presents the CV curves at scan rates from 5 mV s$^{-1}$ to 200 mV s$^{-1}$ between 0 V and 3.5 V in a two-electrode measurement system. All the CV curves exhibit quasi-rectangular and symmetric shapes, indicating an ideal capacitive behavior and high conductivity due to the horizontal alignment of the nanotubes in the flexible electrodes. To evaluate the capacitive performance of the cell, GCD curves at different current densities from 5 mA cm$^{-2}$ to 500 mA cm$^{-2}$ were investigated. As shown in FIG. 6C, the symmetric and linear charge and discharge characteristics at all current densities reveal a rapid I-V response and reversible electrochemical reactions. The areal capacitances of the flexible asymmetric cell at various current densities were then calculated and presented in FIG. 6D. At 5 mA cm$^{-2}$, the cell exhibits the areal capacitance of 0.64 F cm$^{-2}$, which is also much higher compared with most state-of-the-art works based on carbon, other CP and metal oxide materials. (See, e.g., S. Wang et al., *Small*, 2017, 13, 1603330; Y. Ko et al., *Nature communications*, 2017, 8, 536; X. Liu et al. *Small*, 2018, 14, 1702641; Y. Bu et al., *Electrochimica Acta*, 2018, 271, 624-631; S. Zeng et al., *Journal of Materials Chemistry A*, 2015, 3, 23864-23870; H. Moon et al., *Scientific reports*, 2017, 7, 41981; and N. Wang et al., *Journal of Power Sources*, 2018, 395, 228-236.) The capacitance decreased from 0.64 F cm$^{-2}$ to 0.32 F cm$^{-2}$ when the applied current density increased by 100×, showing superior capacitance retention performance to other works cited above. The high capacitance, as well as high capacitance retention, can be attributed to several factors: (i) the synergistic effect of high pseudocapacitance for P3MT and high conductivity for HACNTs. The HACNTs provide a stable mechanical nanostructure for ions transfer in the channels between CNTs and ion diffusion in the bulk of electrodes. (ii) the provision of interconnected pathways ions through the pore network of the polymer due to the highly porous structure of the electrode and enhanced ions transport during the charge/discharge process. These properties translate into high relative areal energy and power densities across a wide range of current densities (details can be found in the Experimental section). A Ragone plot describing the relationship between areal energy and power density of the flexible asymmetric cell is presented in FIG. 6E and compared to recent works for comparison. (See, e.g., L. Dong et al., *Nano energy* 2017, 34, 242; X. Liu et al., *Small* 2018, 14, 1702641; N. Wang et al., *Journal of Power Sources* 2018, 395, 228; S. Wang et al., *Small* 2017, 13, 1603330; L. Dong et al., *Advanced Materials* 2016, 28, 1675.) The assembled asymmetric cell delivers maximum energy and power densities of 1.08 mWh cm$^{-2}$ and 1.75 W cm$^{-2}$, respectively, which are much higher than many other flexible supercapacitor cells reported previously based on either symmetric or asymmetric configurations. (See, e.g., S. Wang et al., *Small*, 2017, 13, 1603330; Y. Ko et al., *Nature communications*, 2017, 8, 536; X. Liu et al. *Small*, 2018, 14, 1702641; N. Wang et al., *Journal of Power Sources*, 2018, 395, 228-236; and L. Dong et al., *Advanced Materials*, 2016, 28, 1675-1681.) It is noted that the energy density decreases very little with increasing power density, indicating excellent energy density retention. Such performance is highly desired for portable or wearable electronics demanding fast-charging technologies.

Figure 7A:
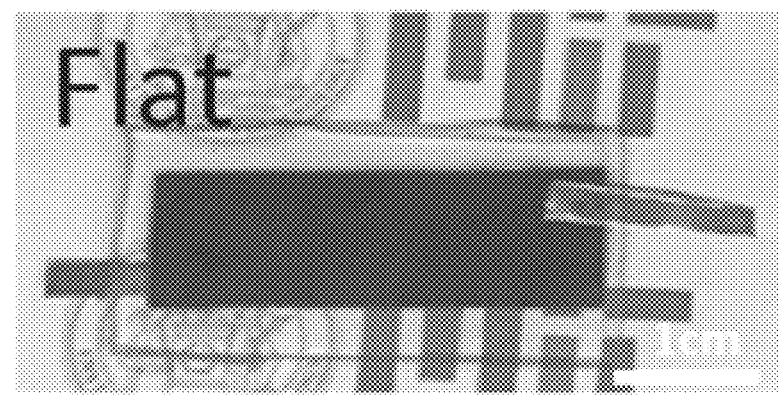
FIGS. 7A-7D illustrate, according to certain embodiments, bending tests of asymmetric cells.
Figure 7A:
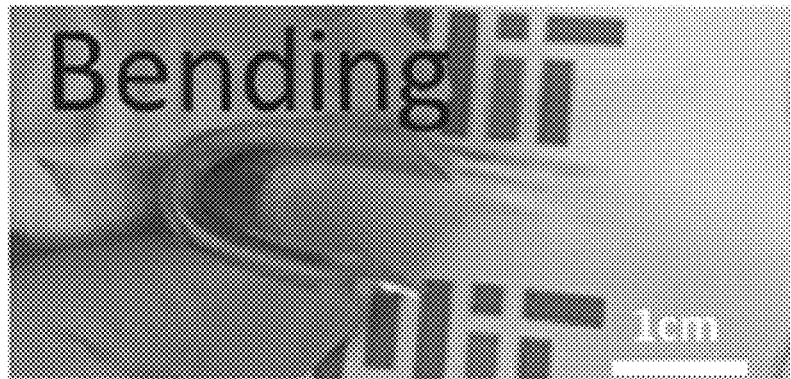
Figure 7B:
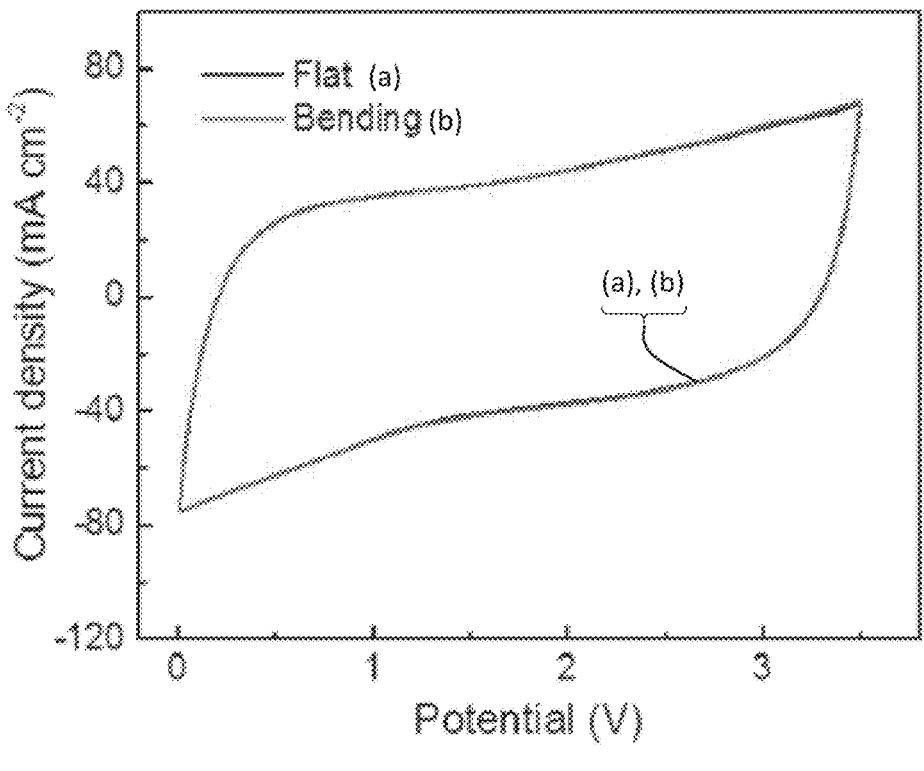
Figures 7C, 7D:
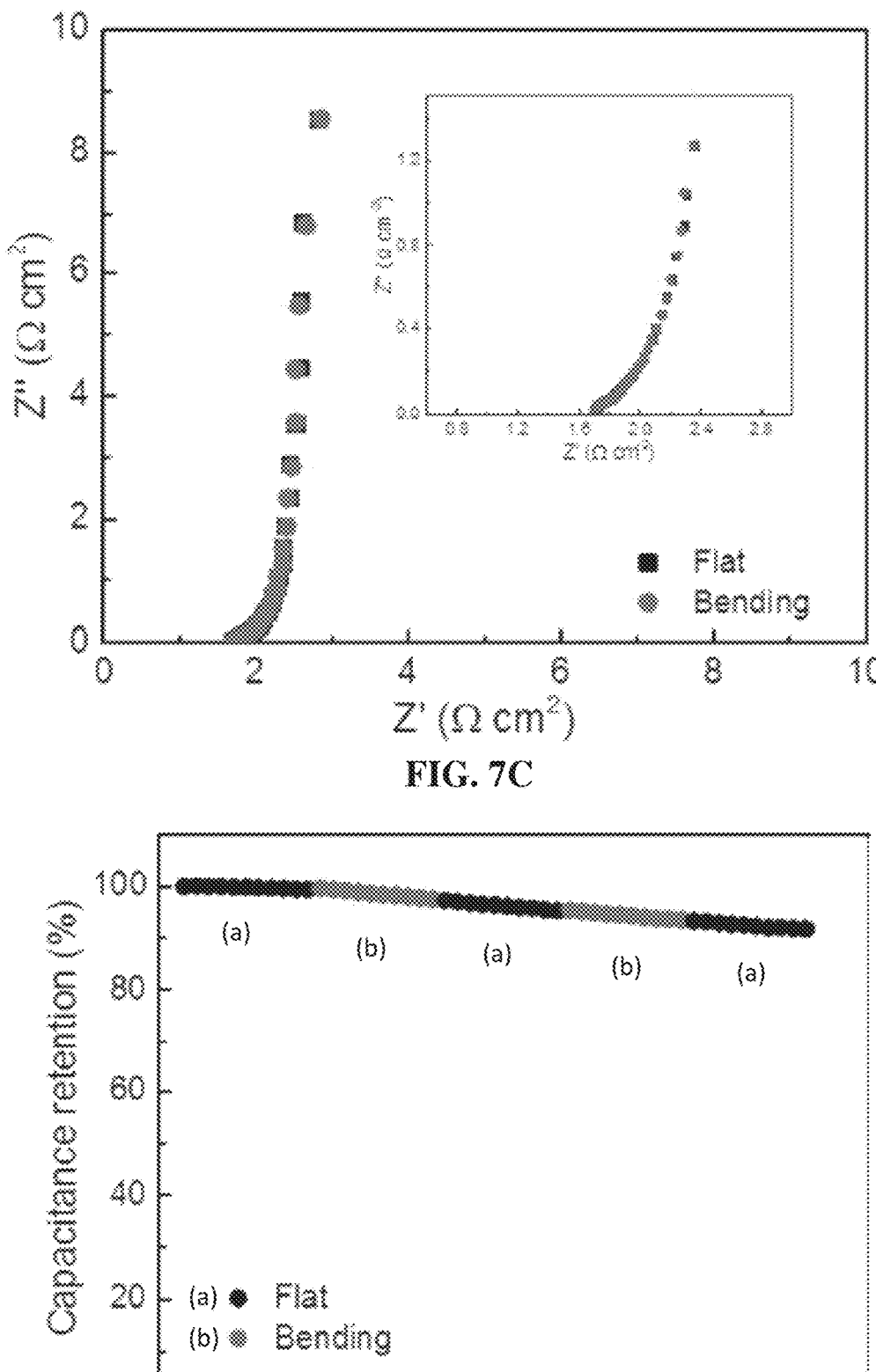

To evaluate the mechanical robustness of the asymmetric supercapacitor cell, the electrochemical performances under mechanical deformation have been characterized and compared with those under the unstrained state, as shown in FIGS. 7A-7D. The deformation was achieved with bending angle of 180° and radius of curvature ~5 mm. As shown in FIG. 7B, there are no apparent changes in the CV curves under 100 mV s$^{-1}$ between the loaded and unloaded states, indicating a flexible high-performing device. The superior mechanical reliability was also confirmed by the comparisons of Nyquist plots in the impedance test, with little changes as shown in FIG. 7C. The sharp rise of the imaginary part of Nyquist plots in the low-frequency range indicates ideal capacitive performance of the cells. By enlarging the Nyquist plots in the high-frequency range, the equivalent series resistance (ESR) can be found at the intersection between the plot and the x-axis). From the inset of FIG. 7D, the flexible cell exhibits the same small ESR of 1.7 Ω cm$^2$ under both the loaded and unloaded states. The ESR is smaller or competitive compared with those in extant works. (See, e.g., S. Wang et al., *Small*, 2017, 13, 1603330; Y. Zhou et al., *Electrochimica Acta*, 2013, 111, 608-613; and A. Liu et al., *Advanced Materials*, 2017, 29, 1606091.) The small ESR represents the high conductivity of the flexible electrodes and originates from the well-aligned nanostructures, giving rise to the high capacitance retention and high power density observed above. The charge/discharge cycling tests at 100 mA cm$^{-2}$ while cycling bending (load-unload cycles) were also carried out and the results are presented in FIG. 7D. The cell was operated alternately in normal flat and bending states for 1000 cycles each and finally recovered to its flat state. After 5000 cycles, the asymmetric cell exhibits a high capacitance retention of 92%, showing that mechanical bending has a small influence on the ion transport in the electrodes, which we attribute to the strong and robust support of the aligned carbon nanotube scaffold in both electrodes. Hence, the flexible cell exhibits characteristics needed and desired for portable and wearable power sources.

Conclusions

P3MT/HACNTs nanocomposite electrodes have been designed and fabricated for flexible supercapacitor cells. HACNTs, fabricated from a facile rolling method, provide aligned carbon nanofibers to enhance ion transport in and out of the bulk of the electrode, facilitating pseudocapacitive ion storage in the bulk of the conformal P3MT conductive polymer (CP). Compared with conventional flexible substrates with random dispersion of fillers, HACNTs provide superior mechanical support and higher electrochemical performance, relative to a direct comparison here to CNT buckypaper. By conformal coating of new P3MT CP on the HACNTs with our unique oCVD method, the areal capacitance increased 3× to more than 3 F cm$^{-2}$ at 5 mA cm$^{-2}$. The high capacitance is retained even at high current density, which is also attributed to the well-organized nanomorphology of the electrodes. Asymmetric flexible supercapacitor cells based on the HACNT and P3MT/HACNT electrodes exhibited remarkable energy and power densities beyond all other reported works at 1.08 mWh cm$^{-2}$ and 1.75 W cm$^{-2}$, respectively. Furthermore, the electrochemical performance changed very little under severe bending, indicating excellent mechanical cycling performance suggesting the new electrodes are promising for wearable and portable electronic applications.

Experimental

Preparation of HACNTs: Aligned CNTs (A-CNTs) were grown firstly by thermal catalytic chemical vapor deposition (CVD) on silicon wafers using iron (Fe) on alumina as the catalyst. These as-grown carbon nanotubes (CNTs) have a highly aligned structure with approximately 1% (1% CNT by volume and 99% air) volume fraction and densities of $10^9$-$10^{10}$ CNTs per $cm^2$. The average diameter of these CNTs is 8 nm (multiwall CNTs with 3-5 shells of walls) and the CNT-CNT spacing (center to center) is approximately 80 nm in the as-grown A-CNT forest. The A-CNTs were densified and reoriented horizontally to HACNTs using a 10 mm diameter Teflon rod or razor blade along the horizontal alignment direction as shown in the middle of FIG. 3A. The thickness is reduced from ~2.4 mm to 200 μm after densification. Since the post-growth $H_2$ anneal step weakens the attachment of the CNTs to the catalyst layer, the CNT film adhered on the substrate can be easily peeled off. For a comparison, the CNT buckypaper was also prepared by vacuum filtration of the MWCNT aqueous dispersion. (See M. Endo et al., *Nature*, 2005, 433, 476.) As described above, the thickness of the HACNT film is 200 μm and the CNT Vf is 12%, and for comparison, the buckypaper film has thickness 200 μm and Vf ~15%.

Preparation of P3MT/HACNTs: Deposition of P3MT CP on HACNTs was performed by using the oCVD process. The HACNTs were held facing the oxidizing agent in a vacuum chamber. Heating the oxidizing agent allowed for its sublimation into the CNT arrays. 3MT was polymerized by oCVD technology. (See K. K. Gleason, *CVD Polymers: Fabrication of Organic Surfaces and Devices*, John Wiley & Sons, 2015) 3-MT was purchased from Sigma Aldrich and used without further processing. The monomer, 3-MT, is heated to 130° C., and is introduced into a vacuum chamber in vapor phase. At the same time, the oxidant iron (III) chloride, is vaporized after being heated up to 200° C. The monomer molecules and oxidant molecules are then mixed in the vapor phase and adsorbed on the substrate HACNT. Upon adsorption, the reaction between oxidant and monomer take place, leading to the polymerization of 3-MT. During the oCVD process, the temperature of the substrate HACNT is controlled as 40° C., and the pressure of the vacuum chamber is controlled as 150 mTorr. This yields a conformal P3MT coating of 5 nm on the CNTs in the HACNT nanocomposite film.

Fabrication of Flexible Asymmetric Supercapacitor Cells: The asymmetric cells were prepared by assembling P3MT/HACNTs as the positive electrode and HACNTs as the negative electrode, which were separated by a porous film (Celgard 3501, Celgard LLC). 1 M tetraethylammonium tetrafluoroborate/propylene carbonate (Et4NBF4/PC) was used as the electrolyte. Each electrode was transferred onto an elastic polydimethylsiloxane (PDMS) substrate (~200 μm thickness) by pressing the PDMS film on the electrode. The whole cell was then constructed by assembling the two PDMS-supported electrodes and thin copper foils (~50 μm thickness) were used as the current collectors.

Materials Characterizations: The nanomorphology of Electrodes was characterized by Ultra plus Zeiss SEM and FEI Tecnai $G^2$ Spirit TWIN TEM. The Raman spectra were obtained by Horiba Jobin Yvon HR800 in the Institute for Soldier Nanotechnologies at MIT.

Electrochemical Characterizations: CV, GCD, and Impedance tests were performed by using a VersaSTAT 4 instrument (Princeton Applied Research). The areal capacitance of electrode and cell can be obtained from discharge profile in GCD test based on the equation below $$C=I/(dV/dt) \tag{1}$$

where I is the discharge current density; t is the time during the discharge process and V is the potential. The areal energy density and power density can be calculated by using the following equations $$E = \frac{1}{2}C(V_1^2 - V_2^2) \tag{2}$$

$$P = \frac{E}{\Delta t} \tag{3}$$

where $V_1$-$V_2$ is the potential window and $\Delta t$ is the discharge time. When $V_2$=0, Equation 2 simplifies to the following:

$$E = \frac{1}{2}C\Delta V^2 \tag{4}$$

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that embodiments described herein are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:

rearranging a plurality of elongated electronically-conductive nanostructures on a surface such that the plurality of elongated electronically-conductive nanostructures transition from a first arrangement in which longest dimensions of the elongated electronically-conductive nanostructures are oriented substantially perpendicular to the surface to a second arrangement in which a majority of the elongated electronically-conductive nanostructures have longest dimensions oriented substantially parallel to the surface and oriented more greatly in a first direction parallel to the surface than in another direction perpendicular to the first direction; and associating a pseudocapacitive material with the plurality of elongated electronically-conductive nanostructures such that:

the majority of the elongated electronically-conductive nanostructures are conformally coated with the pseudocapacitive material, a thickness of the pseudocapacitive material, over at least 80% of a surface area of the elongated electronically-conductive nanostructures that are coated with the pseudocapacitive material, does not deviate from an average thickness of the pseudocapacitive material by more than 50%, and the majority of the elongated electronically-conductive nanostructures have a first end that is attached to the surface and a second end opposite the first end that is not attached to the surface.

2. The method of claim 1, wherein the rearranging comprises rolling a mechanical device across the plurality of elongated electronically-conductive nanostructures.

3. The method of claim 1, wherein the associating comprises depositing the pseudocapacitive material via chemical vapor deposition.

4. The method of claim 1, wherein the pseudocapacitive material is an electronically and/or ionically conductive polymer.

5. The method of claim 1, wherein the pseudocapacitive material comprises poly(3-methylthiophene).

6. The method of claim 1, wherein the elongated electronically-conductive nanostructures comprise carbon based elongated electronically-conductive nanostructures.

7. The method of claim 6, wherein the elongated electronically-conductive nanostructures comprise multi-walled carbon nanotubes.

* * * * *